United States Patent
Igari et al.

(10) Patent No.: US 11,236,218 B2
(45) Date of Patent: Feb. 1, 2022

(54) LATEX COMPOSITION AND FILM MOLDED BODY

(71) Applicant: ZEON CORPORATION, Tokyo (JP)

(72) Inventors: Naohiro Igari, Tokyo (JP); Misa Yamamoto, Tokyo (JP); Masaru Kitagawa, Tokyo (JP); Shinji Kato, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/078,554

(22) PCT Filed: Feb. 24, 2017

(86) PCT No.: PCT/JP2017/007225
§ 371 (c)(1),
(2) Date: Aug. 21, 2018

(87) PCT Pub. No.: WO2017/146238
PCT Pub. Date: Aug. 31, 2017

(65) Prior Publication Data
US 2019/0177517 A1    Jun. 13, 2019

(30) Foreign Application Priority Data
Sep. 30, 2016 (JP) ................ JP2016-193434

(51) Int. Cl.
| C08L 13/02 | (2006.01) |
| C08K 3/10 | (2018.01) |
| C08K 5/053 | (2006.01) |
| A41D 19/04 | (2006.01) |
| C08K 5/098 | (2006.01) |
| C08K 3/24 | (2006.01) |
| C08F 2/22 | (2006.01) |
| C08F 236/12 | (2006.01) |
| C08F 220/32 | (2006.01) |

(52) U.S. Cl.
CPC .............. *C08L 13/02* (2013.01); *A41D 19/04* (2013.01); *C08F 2/22* (2013.01); *C08K 3/10* (2013.01); *C08K 3/24* (2013.01); *C08K 5/053* (2013.01); *C08K 5/098* (2013.01); *C08F 220/32* (2013.01); *C08F 236/12* (2013.01); *C08L 2203/16* (2013.01)

(58) Field of Classification Search
CPC ....... C08L 13/02; C08L 2203/16; C08K 3/10; C08K 5/053; C08F 236/12; A41D 19/04
See application file for complete search history.

(56) References Cited

U.S. PATENT DOCUMENTS

| 2002/0101007 A1* | 8/2002 | Koide ................... C08K 3/011 264/301 |
| 2003/0017286 A1 | 1/2003 | Williams et al. |
| 2004/0010067 A1 | 1/2004 | Ota et al. |
| 2005/0038174 A1 | 2/2005 | Suzuki |
| 2006/0059604 A1 | 3/2006 | Lai et al. |
| 2006/0253956 A1 | 11/2006 | Lipinski |
| 2006/0257674 A1 | 11/2006 | Lipinski et al. |
| 2007/0149693 A1* | 6/2007 | Aida ................... C08K 3/22 524/543 |
| 2008/0227913 A1 | 9/2008 | Koide |
| 2008/0319119 A1 | 12/2008 | Waddell et al. |
| 2009/0292081 A1 | 11/2009 | Suddaby |
| 2010/0168302 A1* | 7/2010 | Nagamori ............. C08K 5/18 524/186 |
| 2011/0287254 A1 | 11/2011 | Lipinski |
| 2012/0137404 A1 | 6/2012 | Lipinski |
| 2012/0172509 A1 | 7/2012 | Nagamori et al. |
| 2012/0246799 A1 | 10/2012 | Khoo et al. |
| 2012/0291180 A1 | 11/2012 | Lipinski |
| 2013/0102725 A1 | 4/2013 | Nagamori et al. |
| 2013/0191964 A1 | 8/2013 | Khoo et al. |
| 2013/0276208 A1 | 10/2013 | Lipnski |
| 2014/0296404 A1 | 10/2014 | Nagamori et al. |
| 2015/0232637 A1* | 8/2015 | Cha ................... C08K 3/346 524/447 |
| 2016/0053095 A1 | 2/2016 | Lipinski |
| 2017/0088700 A1 | 3/2017 | Nakashima et al. |
| 2017/0137584 A1 | 5/2017 | Tung et al. |
| 2019/0010271 A1 | 1/2019 | Kodemura et al. |
| 2019/0040238 A1 | 2/2019 | Lee et al. |
| 2019/0119474 A1 | 4/2019 | Tung et al. |

FOREIGN PATENT DOCUMENTS

| CN | 101456922 A | 6/2009 |
| JP | H03-258842 A | 11/1991 |
| JP | H07-316211 A | 12/1995 |
| JP | 2005-060577 A | 3/2005 |
| JP | 2008-297594 A | 12/2008 |

(Continued)

OTHER PUBLICATIONS

Aug. 28, 2018 International Preliminary Report on Patentability issued in International Patent Application PCT/JP2017/007225.
Apr. 25, 2017 International Search Report issued in International Patent Application PCT/JP2017/007225.
Sep. 18, 2019 Extended Search Report issued in European Patent Application No. 17756672.6.
Sep. 18, 2019 Extended Search Report issued in European Patent Application No. 17756673A.

(Continued)

*Primary Examiner* — Robert D Harlan
(74) *Attorney, Agent, or Firm* — Oliff PLC

(57) ABSTRACT

A latex composition has a latex of a carboxyl group-containing conjugated diene rubber and a metal compound including a trivalent or higher metal, wherein a content of the metal compound is 0.1 to 1.5 parts by weight, based on 100 parts by weight of the carboxyl group-containing conjugated diene rubber.

14 Claims, No Drawings

(56) References Cited

FOREIGN PATENT DOCUMENTS

| JP | 2009-520049 A | 5/2009 |
|---|---|---|
| JP | 2009-138194 A | 6/2009 |
| JP | 2012-188797 A | 10/2012 |
| JP | 5184720 B2 | 4/2013 |
| JP | 5697578 B2 | 4/2015 |
| JP | 2015-105281 A | 6/2015 |
| WO | 00/73367 A1 | 12/2000 |
| WO | 2005/095508 A1 | 10/2005 |
| WO | 2007/072900 A1 | 6/2007 |
| WO | 2015/147010 A1 | 10/2015 |
| WO | 2016/072835 A1 | 5/2016 |
| WO | 2016/104057 A1 | 6/2016 |
| WO | 2017/116227 A1 | 7/2017 |
| WO | 2017/130889 A1 | 8/2017 |

OTHER PUBLICATIONS

Sep. 18, 2019 Extended Search Report issued in European Patent Application No. 17756674.2.
Lakatos et al., "Complexes of Al(III) with D-gluconic acid," Science Direct, Polyhedron, No. 27, pp. 118-124, 2008.
Pallagi et al., "Complexation of Al (III) with gluconate in alkaline to hyperalkaline solutions: formation, stabiity and structure," Dalton Transactions, No. 42, pp. 13470-13476, 2013.
Motekaitis et al., "Complexes of Aluminum (III) with Hydroxy Carboxylic Acids," Inorg. Chem., No. 23, pp. 18-23, 1984.
Jun. 19, 2020 Office Action issued in U.S. Appl. No. 16/079,287.
Jun. 19, 2020 Office Action issued in U.S. Appl. No. 16/079,225.
Aug. 19, 2021 Office Action issued in Malaysian Patent Application No. PI 2018001475.

* cited by examiner

LATEX COMPOSITION AND FILM MOLDED BODY

TECHNICAL FIELD

The present invention relates to a latex composition, which can suppress the occurrence of delayed allergies (Type IV) in addition to immediate allergies (Type I), and which is capable of producing a film famed article, such as a dip-molded article, having high tensile strength, large elongation, and a supple texture, a method for producing such a latex composition, and a dip-molded article and a film famed article obtained by using such a latex composition.

BACKGROUND ART

Conventionally, a dip-molded article, such as a nipple, a balloon, a glove, a balloon, a sack or the like produced by dip-molding a latex composition containing natural latex represented by natural rubber latex and used in contact with a human body is known. However, since natural latex contains a protein that causes allergic symptoms in the human, thus contains a protein that causes immediate allergic (Type I) symptoms in the human body, there have been problems with dip-molded articles that come into direct contact with a living mucous membrane or an organ. Therefore, the use of synthetic nitrile rubber latex has been studied.

For example, Patent Document 1 discloses a latex composition obtained by blending zinc oxide, sulfur, and a vulcanization accelerator with an emulsion including a carboxylated nitrile butadiene random teipolymer of acrylonitrile, carboxylic acid, and butadiene and having a total solid content of 15 to 25% by weight. However, although it is possible with the technique of Patent Document 1 to prevent the occurrence of immediate allergies (Type I), when foiled into a dip-molded article, the sulfur and the vulcanization accelerator included in the dip-molded article cause delayed allergic (Type IV) symptoms the when dip-molded article comes into contact with the human body.

On the other hand, for example, Patent Document 2 discloses a latex composition that includes 25 to 30% by weight of acrylonitrile residues, 62 to 71% by weight of butadiene residues, 4 to 8% by weight of unsaturated carboxylic acid residues, and zinc oxide, and that does not include sulfur acting as a crosslinking agent or a sulfur compound acting as a vulcanization accelerator. According to the technique of Patent Document 2, since it does not contain sulfur or a sulfur compound as a vulcanization accelerator, the occurrence of not only immediate allergies (Type I), but also delayed allergies (Type IV) can be suppressed, but the obtained dip-molded article has poor elongation and inferior texture and feel.

RELATED ART

Patent Documents

Patent Document 1: Japanese Patent No. 5697578
Patent Document 2: Japanese Patent No. 5184720

SUMMARY OF THE INVENTION

Problem to be Solved by the Invention

It is an object of the present invention to provide a latex composition, which can suppress the occurrence of delayed allergies (Type IV) in addition to immediate allergies (Type I), and which is capable of producing a film famed article, such as a dip-molded article, having high tensile strength, large elongation, and a supple texture, a method for producing such a latex composition, and a dip-molded article and a film famed article obtained by using such a latex composition.

Means for Solving the Problem

As a result of extensive studies to solve the above-mentioned problems, the present inventors found that by using a latex composition obtained by blending a metal compound including a trivalent or higher metal with a latex of a carboxyl group-containing conjugated diene rubber (A), the above-mentioned objectives could be achieved, thereby completing the present invention.

Specifically, according to the present invention, there is provided a latex composition comprising a latex of a carboxyl group-containing conjugated diene rubber (A) and a metal compound (B) including a trivalent or higher metal, wherein a content of the metal compound (B) is 0.1 to 1.5 parts by weight, based on 100 parts by weight of the carboxyl group-containing conjugated diene rubber (A).

Preferably, the metal compound (B) is an aluminum compound.

The latex composition of the present invention preferably further comprises at least one alcoholic hydroxyl group-containing compound (C) selected from a saccharide (c1), a sugar alcohol (c2), a hydroxy acid (c3), and a hydroxy acid salt (c4).

Preferably, a content of the metal compound (B) and a content of the alcoholic hydroxyl group-containing compound (C) are such that a weight ratio expressed as "metal compound (B):alcoholic hydroxyl group-containing compound (C)" is 1:0.1 to 1:50.

Preferably, the alcoholic hydroxyl group-containing compound (C) is at least one selected from the sugar alcohol (c2) and the hydroxy acid salt (c4).

Preferably, the carboxyl group-containing conjugated diene rubber (A) is a carboxyl group-containing nitrile rubber (a1) containing 56 to 78% by weight of a conjugated diene monomer unit, 20 to 40% by weight of an ethylenically unsaturated nitrile monomer unit, and 2 to 6.5% by weight of an ethylenically unsaturated carboxylic acid monomer.

Preferably, the carboxyl group-containing conjugated diene rubber (A) contains a conjugated diene monomer unit, an ethylenically unsaturated carboxylic acid monomer unit, and at least one monomer unit selected from an amide group-containing monomer unit and an epoxy group-containing monomer unit.

Preferably, the monomer constituting the at least one monomer unit selected from an amide group-containing monomer unit and an epoxy group-containing monomer unit is (meth)acrylamide.

Preferably, the monomer constituting the at least one monomer unit selected from an amide group-containing monomer unit and an epoxy group-containing monomer unit is an epoxy group-containing (meth)acrylate.

Further, according to the present invention, there is provided a method for producing a latex composition comprising a latex of a carboxyl group-containing conjugated diene rubber (A) and a metal compound (B) including a trivalent or higher metal, comprising:

a first step of obtaining the latex of the carboxyl group-containing conjugated diene rubber (A) by emulsion polymerization at 0 to 25° C. of a monomer mixture comprising at least a conjugated diene monomer and an ethylenically unsaturated carboxylic acid monomer; and a second step of blending the metal compound (B) with the latex of the carboxyl group-containing conjugated diene rubber (A).

Alternatively, according to the present invention, there is provided a method for producing a latex composition comprising a latex of a carboxyl group-containing conjugated diene rubber (A) and a metal compound (B) including a trivalent or higher metal, comprising:

a first step of obtaining the latex of the carboxyl group-containing conjugated diene rubber (A) by emulsion polymerization of a monomer mixture comprising at least a conjugated diene monomer and an ethylenically unsaturated carboxylic acid monomer in the presence of 0.15 to 0.95 parts by weight of a chain transfer agent based on 100 parts by weight of the monomer mixture; and a second step of blending the metal compound (B) with the latex of the carboxyl group-containing conjugated diene rubber (A).

In the above-mentioned latex composition production methods, in the second step, it is preferable to further blend, in addition to the metal compound (B), at least one alcoholic hydroxyl group-containing compound (C) selected from a saccharide (c1), a sugar alcohol (c2), a hydroxy acid (c3), and a hydroxy acid salt (c4) to the latex of the carboxyl group-containing conjugated diene rubber (A).

Further, according to the present invention, there is provided a method for producing a dip-molded article, the method comprising a step of dip-molding the latex composition of the present invention, or a latex composition obtained by the production method of the present invention.

In addition, according to the present invention, there is provided a film famed article famed from the latex composition of the present invention.

Effects of Invention

According to the present invention, there can be provided a latex composition, which can suppress the occurrence of delayed allergies (Type IV) in addition to immediate allergies (Type I), and which is capable of producing a film famed article, such as a dip-molded article, having high tensile strength, large elongation, and a supple texture, a method for producing such a latex composition, and a dip-molded article and a film famed article obtained by using such a latex composition.

DESCRIPTION OF EMBODIMENTS

The latex composition of the present invention comprises a latex of a carboxyl group-containing conjugated diene rubber (A) and a metal compound including a trivalent or higher metal, wherein the metal compound has a content of 0.1 to 1.5 parts by weight, based on 100 parts by weight of the carboxyl group-containing conjugated diene rubber (A).

Latex of Carboxyl Group-Containing Conjugated Diene Rubber (A)

The latex of the carboxyl group-containing conjugated diene rubber (A) used in the present invention is a latex of a copolymer obtained by copolymerizing a monomer mixture including at least a conjugated diene monomer and an ethylenically unsaturated carboxylic acid monomer. The latex of the carboxyl group-containing conjugated diene rubber (A) is preferably at least one selected from a carboxyl group-containing nitrile rubber (a1), a carboxyl group-containing styrene-butadiene rubber (a2), and a carboxyl group-containing conjugated diene rubber (a3).

The latex of the carboxyl group-containing nitrile rubber (a1) is a latex of a copolymer obtained by copolymerizing an ethylenically unsaturated nitrile monomer in addition to a conjugated diene monomer and an ethylenically unsaturated carboxylic acid monomer. In addition to these, this latex may be a latex of a copolymer obtained by copolymerizing with another optionally-used ethylenically unsaturated monomer and is copolymerizable therewith.

Examples of the conjugated diene monomer include 1,3-butadiene, isoprene, 2,3-dimethyl-1,3-butadiene, 2-ethyl-1,3-butadiene, 1,3-pentadiene, chloroprene, and the like. Of these, 1,3-butadiene and isoprene are preferable, and 1,3-butadiene is more preferable. These conjugated diene monomers can be used singly or in combinations. The content of the conjugated diene monomer unit famed by the conjugated diene monomer in the carboxyl group-containing nitrile rubber (a1) is preferably 56 to 78% by weight, more preferably 56 to 73% by weight, and even more preferably 56 to 70% by weight. By setting the content of the conjugated diene monomer unit within the above range, the obtained film famed article, such as a dip-molded article, has a better texture and longer elongation while also having sufficient tensile strength.

The ethylenically unsaturated carboxylic acid monomer is not particularly limited as long as it is an ethylenically unsaturated monomer containing a carboxyl group. Examples thereof may include ethylenically unsaturated monocarboxylic acid monomers such as acrylic acid and methacrylic acid; ethylenically unsaturated polyvalent carboxylic acid monomers such as itaconic acid, maleic acid, and fumaric acid; ethylenically unsaturated polyvalent carboxylic acid anhydrides such as maleic anhydride and citraconic anhydride; and ethylenically unsaturated polycarboxylic acid partial ester monomers such as monobutyl fumarate, monobutyl malate, and mono-2-hydroxypropyl maleate. Of these, ethylenically unsaturated monocarboxylic acids are preferable, and methacrylic acid is particularly preferable. These ethylenically unsaturated carboxylic acid monomers can also be used in the foam of an alkali metal salt or an ammonium salt. Further, the ethylenically unsaturated carboxylic acid monomer can be used singly or in combinations. The content of the ethylenically unsaturated carboxylic acid monomer unit famed by the ethylenically unsaturated carboxylic acid monomer in the carboxyl group-containing nitrile rubber (a1) is preferably 2 to 6.5% by weight, more preferably 2 to 6% by weight, even more preferably 2 to 5% by weight, still more preferably 2 to 4.5% by weight, and particularly preferably 2.5 to 4.5% by weight. By setting the content of the conjugated diene monomer unit within the above range, the obtained film famed article, such as a dip-molded article, has a better texture and longer elongation while also having sufficient tensile strength.

The ethylenically unsaturated nitrile monomer is not particularly limited as long as it is an ethylenically unsaturated monomer containing a nitrile group. Examples thereof may include acrylonitrile, methacrylonitrile, fumaronitrile, α-chloroacrylonitrile, α-cyanoethyl acrylonitrile, and the like. Of these, acrylonitrile and methacrylonitrile are preferable, and acrylonitrile is more preferable. These ethylenically unsaturated nitrile monomers can be used singly or in combinations. The content of the ethylenically unsaturated nitrile monomer unit formed by the ethylenically unsaturated nitrile monomer in the carboxyl group-containing nitrile rubber (a1) is preferably 20 to 40% by weight, more preferably 25 to 40% by weight, and even more preferably 30 to 40% by weight. By setting the content of the conjugated diene monomer unit within the above range, the obtained film famed article, such as a dip-molded article, has a better texture and longer elongation while also having sufficient tensile strength.

In addition, the other ethylenically unsaturated monomer copolymerizable with the conjugated diene monomer, the ethylenically unsaturated carboxylic acid monomer, and the ethylenically unsaturated nitrile monomer is not particularly limited. However, from the perspective of enabling the film famed article, such as a dip-molded article, to have even higher tensile strength and higher stress retention, at least one monomer selected from an amide group-containing monomer and an epoxy group-containing monomer is preferable.

The amide group-containing monomer is not particularly limited as long as it is a monomer having at least one amide group in one molecule. Examples thereof may include (meth)acrylamide, N-methyl (meth)acrylamide, N-ethyl (meth)acrylamide, N-n-propyl (meth)acrylamide, N-isopropyl(meth)acrylamide, N-n-butyl(meth)acrylamide, N-isobutyl(meth)acrylamide, N,N-dimethyl(meth)acrylamide, N-methylol (meth)acrylamide, N-methoxymethyl (meth)acrylamide, N-ethoxymethyl(meth)acrylamide, N-propoxymethyl(meth)acrylamide, N-butoxymethyl(meth) acrylamide, N,N-dimethyl(meth)acrylamide, N,N-dimethylaminopropyl(meth)acrylamide, N,N-dimethylaminoethyl (meth)acrylamide, N,N-dimethylol(meth) acrylamide, diacetone (meth)acrylamide, (meth)acryloyl morpholine, and the like. Of these, (meth)acrylamide is preferable, N-methylol(meth)acrylamide and N,N-dimethylol(meth) acrylamide are more preferable, and N-methylol(meth)acrylamide is particularly preferable. These amide group-containing monomers can be used singly or in combinations.

The content of the amide group-containing monomer unit in the carboxyl group-containing nitrile rubber (a1) is preferably 0.1 to 5.0% by weight, more preferably 0.25 to 4.5% by weight, and even more preferably 0.5 to 4.0% by weight. By setting the content of the amide group-containing monomer unit within the above range, the obtained film famed article, such as a dip-molded article, has better tensile strength while also having high stress retention.

The epoxy group-containing monomer is not particularly limited as long as it is a monomer having at least one epoxy group in one molecule. Examples thereof may include glycidyl(meth)acrylate, 3,4-epoxybutyl(meth)acrylate, 3,4-epoxycyclohexyl(meth)acrylate, vinyl glycidyl ether, allyl glycidyl ether, 2-methylallyl glycidyl ether, 3,4-epoxy-1-butene, 3,4-epoxy-1-methyl-1-butene, 3,4-epoxy-1-pentene, 3,4-epoxy-3-methyl-1-pentene, 5,6-epoxy-1-hexene, 1,2-vinylcyclohexene monoepoxide, styrene-p-glycidyl ether, and the like. Of these, an epoxy group-containing (meth)acrylate is preferable, and glycidyl(meth)acrylate is particularly preferable. These epoxy group-containing monomers can be used singly or in combinations.

The content of the epoxy group-containing monomer unit in the carboxyl group-containing nitrile rubber (a1) is preferably 0.1 to 4.0% by weight, more preferably 0.25 to 3.5% by weight, and even more preferably 0.5 to 3.0% by weight. By setting the content of the epoxy group-containing monomer unit within the above range, the obtained film famed article, such as a dip-molded article, has better tensile strength while also having high stress retention.

In addition, the carboxyl group-containing nitrile rubber (a1) can be a compound obtained by copolymerizing with another copolymerizable ethylenically unsaturated monomer other than the at least one monomer selected from an amide group-containing monomer and an epoxy group-containing monomer. Examples of such another copolymerizable ethylenically unsaturated monomer include vinyl aromatic monomers such as styrene, alkylstyrene, and vinylnaphthalene; fluoroalkyl vinyl ethers such as fluoroethyl vinyl ether; ethylenically unsaturated carboxylic acid ester monomers such as methyl (meth)acrylate, ethyl (meth) acrylate, butyl (meth)acrylate, 2-ethylhexyl (meth)acrylate, trifluoroethyl (meth)acrylate, tetrafluoropropyl dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth) acrylate, hydroxyethyl (meth)acrylate, hydroxypropyl (meth)acrylate, and dimethylaminoethyl (meth)acrylate; crosslinkable monomers such as divinylbenzene, polyethylene glycol di(meth)acrylate, polypropylene glycol di(meth) acrylate, trimethylolpropane tri(meth)acrylate, and pentaerythritol (meth)acrylate. These ethylenically unsaturated monomers can be used singly or in combinations.

The content of the other monomer unit famed by the other ethylenically unsaturated monomer in the carboxyl group-containing nitrile rubber (a1) is preferably 10% by weight or less, more preferably 5% by weight or less, and even more preferably 3% by weight or less.

The latex of the carboxyl group-containing nitrile rubber (a1) used in the present invention can be obtained by copolymerizing a monomer mixture containing the above-mentioned monomers, but a method of copolymerizing by emulsion polymerization is preferred. The emulsion polymerization method is described later.

The latex of the carboxyl group-containing styrene-butadiene rubber (a2) used in the present invention is a latex of a copolymer obtained by copolymerizing styrene in addition to 1,3-butadiene as the conjugated diene monomer and an ethylenically unsaturated carboxylic acid monomer. In addition to these, this latex may be a latex of a copolymer obtained by copolymerizing with another optionally-used ethylenically unsaturated monomer and is copolymerizable therewith.

The content of the butadiene unit famed by 1,3-butadiene in the carboxyl group-containing styrene-butadiene rubber (a2) is preferably 56 to 78% by weight, more preferably 56 to 73% by weight, and even more preferably 56 to 70% by weight. By setting the content of the butadiene unit within the above range, the obtained film famed article, such as a dip-molded article, has a better texture and longer elongation while also having sufficient tensile strength.

The ethylenically unsaturated carboxylic acid monomer is not particularly limited as long as it is an ethylenically unsaturated monomer containing a carboxyl group. Examples of ethylenically unsaturated carboxylic acid monomers that can be used include the same examples as mentioned above for the latex of the carboxyl group-containing nitrile rubber (a1). The content of the ethylenically unsaturated carboxylic acid monomer unit famed by the ethylenically unsaturated carboxylic acid monomer in the carboxyl group-containing styrene-butadiene rubber (a2) is preferably 2 to 6.5% by weight, more preferably 2 to 6% by weight, even more preferably 2 to 5% by weight, still more preferably 2 to 4.5% by weight, and particularly preferably 2.5 to 4.5% by weight. By setting the content of the ethylenically unsaturated carboxylic acid monomer unit within the above range, the obtained film famed article, such as a dip-molded article, has a better texture and longer elongation while also having sufficient tensile strength.

The content of the styrene unit famed by styrene in the carboxyl group-containing styrene-butadiene rubber (a2) is preferably 20 to 40% by weight, more preferably 25 to 40% by weight, and even more preferably 30 to 40% by weight. By setting the content of the styrene unit within the above range, the obtained film foiled article, such as a dip-molded article, has a better texture and longer elongation while also having sufficient tensile strength.

The other ethylenically unsaturated monomer copolymerizable with 1,3-butadiene as the conjugated diene monomer, the ethylenically unsaturated carboxylic acid monomer, and styrene is not particular limited, but from the perspective of enabling the film famed article, such as a dip-molded article, to have even higher tensile strength and higher stress retention, at least one monomer selected from an amide group-containing monomer and an epoxy group-containing monomer is preferable.

The amide group-containing monomer is not particularly limited as long as it is a monomer having at least one amide group in one molecule. For example, the same amide group-containing monomers as mentioned above for the latex of the carboxyl group-containing nitrile rubber (a1) can be used. The content of the amide group-containing monomer unit in the carboxyl group-containing styrene-butadiene rubber (a2) is preferably 0.1 to 5.0% by weight, more preferably 0.25 to 4.5% by weight, and even more preferably 0.5 to 4.0% by weight. By setting the content of the amide group-containing monomer unit within the above range, the obtained film famed article, such as a dip-molded article, has better tensile strength while also having high stress retention.

The epoxy group-containing monomer is not particularly limited as long as it is a monomer having at least one epoxy group in one molecule. For example, the same epoxy group-containing monomers as mentioned above for the latex of the carboxyl group-containing nitrile rubber (a1) can be used. The content of the epoxy group-containing monomer unit in the carboxyl group-containing styrene-butadiene rubber (a2) is preferably 0.1 to 4.0% by weight, more preferably 0.25 to 3.5% by weight %, and even more preferably 0.5 to 3.0% by weight. By setting the content of the epoxy group-containing monomer unit within the above range, the obtained film famed article, such as a dip-molded article, has better tensile strength while also having high stress retention.

In addition, the carboxyl group-containing styrene-butadiene rubber (a2) can be a compound obtained by copolymerizing with another copolymerizable ethylenically unsaturated monomer other than the at least one monomer selected from an amide group-containing monomer and an epoxy group-containing monomer. Examples of such another copolymerizable ethylenically unsaturated monomer include, in addition to the examples (excluding styrene) mentioned above for the latex of the carboxyl group-containing nitrile rubber (a1), conjugated diene monomers other than 1,3-butadiene, such as isoprene, 2,3-dimethyl-1,3-butadiene, 2-ethyl-1,3-butadiene, 1,3-pentadiene, and chloroprene. The content of the other monomer unit famed by the other ethylenically unsaturated monomer in the carboxyl group-containing styrene-butadiene rubber (a2) is preferably 10% by weight or less, more preferably 5% by weight or less, and even more preferably 3% by weight or less.

The latex of the carboxyl group-containing styrene-butadiene rubber (a2) used in the present invention can be obtained by copolymerizing a monomer mixture containing the above-mentioned monomers, but a method of copolymerizing by emulsion polymerization is preferred. The emulsion polymerization method is described later.

The latex of the carboxyl group-containing conjugated diene rubber (a3) used in the present invention is a latex of a copolymer obtained by copolymerizing a conjugated diene monomer and an ethylenically unsaturated carboxylic acid monomer. In addition to these, this latex may be a latex of a copolymer obtained by copolymerizing with another optionally-used ethylenically unsaturated monomer and is copolymerizable therewith.

The content of the conjugated diene monomer unit formed by the conjugated diene monomer in the carboxyl group-containing conjugated diene rubber (a3) is preferably 80 to 98% by weight, more preferably 90 to 98% by weight, and even more preferably 95 to 97.5% by weight. By setting the content of the conjugated diene monomer unit within the above range, the obtained film famed article, such as a dip-molded article, has a better texture and longer elongation while also having sufficient tensile strength.

The ethylenically unsaturated carboxylic acid monomer is not particularly limited as long as it is an ethylenically unsaturated monomer containing a carboxyl group. Examples of ethylenically unsaturated carboxylic acid monomers that can be used include the same examples as mentioned above for the latex of the carboxyl group-containing nitrile rubber (a1). The content of the ethylenically unsaturated carboxylic acid monomer unit famed by the ethylenically unsaturated carboxylic acid monomer in the carboxyl group-containing conjugated diene rubber (a3) is preferably 2 to 10% by weight, more preferably 2 to 7.5% by weight, even more preferably 2 to 6.5% by weight, still more preferably 2 to 6% by weight, particularly preferably 2 to 5% by weight, and most preferably 2.5 to 5% by weight. By setting the content of the ethylenically unsaturated carboxylic acid monomer unit within the above range, the obtained film famed article, such as a dip-molded article, has a better texture and longer elongation while also having sufficient tensile strength.

Examples of the conjugated diene monomer include 1,3-butadiene, isoprene, 2,3-dimethyl-1,3-butadiene, 2-ethyl-1,3-butadiene, 1,3-pentadiene, and chloroprene. As the conjugated diene monomer, any one of these may be used alone, or two or more kinds can be used in combination.

In addition, the other ethylenically unsaturated monomer copolymerizable with the conjugated diene monomer and the ethylenically unsaturated carboxylic acid monomer is not particularly limited. However, from the perspective of enabling the film foiled article, such as a dip-molded article, to have even higher tensile strength and higher stress retention, at least one monomer selected from an amide group-containing monomer and an epoxy group-containing monomer is preferable.

The amide group-containing monomer is not particularly limited as long as it is a monomer having at least one amide group in one molecule. For example, the same amide group-containing monomers as mentioned above for the latex of the carboxyl group-containing nitrile rubber (a1) can be used. The content of the amide group-containing monomer unit in the carboxyl group-containing conjugated diene rubber (a3) is preferably 0.1 to 5.0% by weight, more preferably 0.25 to 4.5% by weight, and even more preferably 0.5 to 4.0% by weight. By setting the content of the amide group-containing monomer unit within the above range, the obtained film famed article, such as a dip-molded article, has better tensile strength while also having high stress retention.

The epoxy group-containing monomer is not particularly limited as long as it is a monomer having at least one epoxy group in one molecule. For example, the same epoxy group-containing monomers as mentioned above for the latex of the carboxyl group-containing nitrile rubber (a1) can be used. The content of the epoxy group-containing monomer unit in the carboxyl group-containing conjugated diene rubber (a3) is preferably 0.1 to 4.0% by weight, more preferably 0.25 to 3.5% by weight, and even more preferably 0.5 to 3.0% by weight. By setting the content of the epoxy group-containing monomer unit within the above range, the obtained film famed article, such as a dip-molded article, has better tensile strength while also having high stress retention.

In addition, the carboxyl group-containing conjugated diene rubber (a3) can be a compound obtained by copolymerizing with another copolymerizable ethylenically unsaturated monomer other than the at least one monomer selected from an amide group-containing monomer and an epoxy group-containing monomer. Examples of such another copolymerizable ethylenically unsaturated monomer include the examples (excluding styrene) mentioned above for the latex of the carboxyl group-containing nitrile rubber (a1). The content of the other monomer unit famed by the other ethylenically unsaturated monomer in the carboxyl group-containing conjugated diene rubber (a3) is preferably 10% by weight or less, more preferably 5% by weight or less, and even more preferably 3% by weight or less.

The latex of the carboxyl group-containing conjugated diene rubber (a3) used in the present invention can be obtained by copolymerizing a monomer mixture containing the above-mentioned monomers, but a method of copolymerizing by emulsion polymerization is preferred. The emulsion polymerization method is described later.

Next, the emulsion polymerization method for obtaining the above-mentioned latex of the carboxyl group-containing conjugated diene rubber (A) (including the latex of the carboxyl group-containing nitrile rubber (a1), the latex of the carboxyl group-containing styrene-butadiene rubber (a2), and the carboxyl group-containing conjugated diene rubber (a3)) is described.

The latex of the carboxyl group-containing conjugated diene rubber (A) can be produced by emulsion polymerization of a monomer mixture containing the above-mentioned monomers by a conventionally known emulsion polymerization method.

The polymerization temperature when carrying out emulsion polymerization is not particularly limited, and it may be selected, for example, in the range of 0 to 75° C., and preferably in the range of 0 to 50° C. However, from the perspective of further increasing the tensile strength of the obtained film famed article, such as a dip-molded article, it is preferable to control the emulsion polymerization temperature to 0 to 25° C. By controlling the emulsion polymerization temperature to 0 to 25° C., the obtained film foiled article, such as a dip-molded article, can have a higher tensile strength while also having large elongation and excellent texture. Therefore, the emulsion polymerization temperature is preferably 0 to 75° C., more preferably 0 to 50° C., even more preferably 0 to 25° C., still more preferably 5 to 20° C., and particular preferably 5 to 15° C.

The specific emulsion polymerization method is not particularly limited as long as it is a method capable of conducting polymerization by controlling the polymerization temperature within the above range. A monomer mixture containing the above-mentioned monomers can be polymerized by a conventionally known method.

From the perspective of obtaining a film famed article, such as a dip-molded article, having an excellent balance in terms of tensile strength, elongation, and texture, when emulsion polymerization of the monomer mixture is carried out, it is preferable to perform the emulsion polymerization in the presence of 0.15 to 0.95 parts by weight of a chain transfer agent based on 100 parts by weight of the monomer mixture used for the polymerization. The amount of the chain transfer agent used is preferably 0.15 to 0.95 parts by weight, more preferably 0.20 to 0.70 parts by weight, and even more preferably 0.20 to 0.50 parts by weight, based on 100 parts by weight of the monomer mixture used for polymerization.

When emulsion polymerization of the monomer mixture is carried out, the molecular weight of the carboxyl group-containing conjugated diene rubber (A) can be appropriately adjusted by performing the emulsion polymerization in the presence of 0.15 to 0.95 parts by weight of a chain transfer agent based on 100 parts by weight of the monomer mixture used for polymerization. This allows the methyl ethyl ketone insoluble content of the resulting carboxyl group-containing conjugated diene rubber (A) and the degree of swelling in methyl ethyl ketone can be set to within a desired range, and as a result, the tensile strength, elongation, and stress at 500% elongation of the obtained film famed article, such as a dip-molded article, can be more precisely balanced.

Specifically, the methyl ethyl ketone insoluble content of the carboxyl group-containing conjugated diene rubber (A) can be set to preferably 50 to 90% by weight, and more preferably 55 to 85% by weight. Further, the degree of swelling of the carboxyl group-containing conjugated diene rubber (A) with respect to methyl ethyl ketone can be set to preferably 10 to 150 times, and more preferably 10 to 100 times.

The methyl ethyl ketone insoluble content and the degree of swelling in methyl ethyl ketone can be measured, for example, by the following method. Specifically, first, a film of the carboxyl group-containing conjugated diene rubber (A) is obtained and a weight (W1) of the dry film before immersion in methyl ethyl ketone is measured. The before-immersion film is placed on an 80-mesh a cage-shaped wire mesh, and immersed in that state in methyl ethyl ketone for 24 hours at room temperature. Then, a weight (W2) of the swollen film remaining on the cage-shaped wire mesh after immersion is measured, and the film after immersion is dried at 105° C. to remove the methyl ethyl ketone and obtain a dry film. The weight of the dry film is measured as a weight (W3). Based on the obtained measurement results, the methyl ethyl ketone insoluble content can be calculated by the following formulae (1) and (2).

$$\text{Methyl ethyl ketone insoluble content (unit: \% by weight)} = (\text{weight of dried film after immersion } (W3)/\text{weight of dry film before immersion } (W1)) \times 100 \quad (1)$$

$$\text{Degree of swelling in methyl ethyl ketone (unit: time)} = (\text{weight of swollen film}(W2)/\text{weight of dried film after immersion}(W3)) \quad (2)$$

The chain transfer agent used in the emulsion polymerization is not particularly limited as long as it can appropriately adjust the molecular weight of the carboxyl group-containing conjugated diene rubber (A) to be obtained. Examples thereof include mercaptans such as n-butyl mercaptan and t-dodecyl mercaptan, sulfides such as tetraethylthiuram sulfide and dibentamethylene thiuram hexasulfide, α-methylstyrene dimers, carbon tetrachloride, and the like. Of these, mercaptans are preferable, and t-dodecyl mercaptan is more preferable. These may be used singly or in combinations.

During emulsion polymerization, in addition to the above-mentioned chain transfer agents, generally-used polymerization auxiliary materials, such as an emulsifier, a polymerization initiator, a molecular weight regulator can be used. The method of adding these polymerization auxiliary materials is not particularly limited, and any method may be used, such as an initially adding in one batch, adding in several stages, or continuously adding the polymerization auxiliary materials.

Examples of the emulsifier include, but are not particularly limited to, nonionic emulsifiers such as polyoxyethylene alkyl ether, polyoxyethylene alkylphenol ether, polyoxyethylene alkyl ester, and polyoxyethylene sorbitan alkyl ester; anionic emulsifiers such as alkylbenzenesulfonic acid salts like potassium dodecylbenzenesulfonate and sodium dodecylbenzene sulfonate, higher alcohol sulfuric acid ester salts, and alkylsulfosuccinic acid salts; cationic emulsifiers such as alkyltrimethylammonium chloride, dialkylammonium chloride, and benzylammonium chloride; and copolymerizable emulsifying agents such as a sulfoester of an $\alpha,\beta$-unsaturated carboxylic acid, a sulfate ester of an $\alpha,\beta$-unsaturated carboxylic acid, and sulfoalkylaryl ether. Among these, anionic emulsifiers are preferable, alkylbenzenesulfonate is more preferable, and potassium dodecylbenzenesulfonate and sodium dodecylbenzenesulfonate are particularly preferable. These emulsifiers can be used singly or in combinations. The amount of emulsifier to be used is preferably 0.1 to 10 parts by weight based on 100 parts by weight of the monomer mixture.

Examples of the polymerization initiator include, but are not particularly limited to, inorganic peroxides such as sodium persulfate, potassium persulfate, ammonium persulfate, potassium peiphosphate, and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-$\alpha$-cumyl peroxide, acetyl peroxide, isobutyryl peroxide, and benzoyl peroxide; and azo compounds such as azobisisobutyronitrile, azobis-2,4-dimethylvaleronitrile, and methyl azobisisobutyrate. Each of these polymerization initiators can be used singly or in combinations. The amount of the polymerization initiator to be used is preferably 0.01 to 10 parts by weight, and more preferably 0.01 to 2 parts by weight, based on 100 parts by weight of the monomer mixture.

In addition, a peroxide initiator can be used as a redox type polymerization initiator in combination with a reducing agent. Examples of the reducing agent include, but are not particularly limited to, a compound containing a metal ion in a reduced state such as ferrous sulfate or cuprous naphthenate; a sulfonic acid compound such as sodium methanesulfonate; and an amine compound such as dimethylaniline. These reducing agents can be used singly or in combinations. The amount of the reducing agent to be used is preferably 3 to 1000 parts by weight based on 100 parts by weight of the peroxide.

The amount of water used during emulsion polymerization is preferably 80 to 600 parts by weight, and particularly preferably 100 to 200 parts by weight, based on 100 parts by weight of the total monomers used.

As the method for adding the monomers, any of a method in which the monomers to be used are added to the reaction vessel in one go, a method in which the monomer is continuously or intermittently added as polymerization proceeds, a method in which a part of the monomers are added and reacted until a specific conversion ratio is reached, and then the remaining monomers are continuously or intermittently added and polymerized, and the like may be employed. In the case of mixing the monomers and adding continuously or intermittently, the composition of the mixture may be constant or may be changed. In addition, each monomer may be added to the reaction vessel after mixing the various monomers to be used in advance, or may be separately added to the reaction vessel.

Further, polymerization auxiliary materials, such as a chelating agent, a dispersing agent, a pH adjusting agent, a deoxidizing agent, and a particle size adjusting agent, can be optionally used. The type and amount to be used of such polymerization auxiliary materials are not particularly limited.

The polymerization time in carrying out the emulsion polymerization is not particularly limited, but it is usually about 5 to 40 hours.

As described above, the monomer mixture is subjected to emulsion polymerization, and when a predetermined polymerization conversion ratio is reached, the polymerization reaction is terminated by cooling the polymerization system or adding a polymerization terminator. The polymerization conversion ratio when the polymerization reaction is terminated is preferably 90% by weight or more, and more preferably 93% by weight or more.

Examples of the polymerization terminator include, but are not particularly limited to, hydroxylamine, hydroxylamine sulfate, diethylhydroxylamine, hydroxyamine sulfonic acid and alkali metal salts thereof, sodium dimethyldithiocarbamate, hydroquinone derivatives, catechol derivatives, and aromatic hydroxydithiocarboxylic acids, such as hydroxydimethylbenzenethiocarboxylic acid, hydroxydiethylbenzenedithiocarboxylic acid, and hydroxydibutylbenzenedithiocarboxylic acid, and alkali metal salts thereof. The amount of the polymerization terminator to be used is preferably 0.05 to 2 parts by weight based on 100 parts by weight of the monomer mixture.

After the polymerization reaction has been terminated, if desired, the latex of the carboxyl group-containing conjugated diene rubber (A) (including the latex of the carboxyl group-containing nitrile rubber (a1), the latex of the carboxyl group-containing styrene-butadiene rubber (a2), and the latex of the carboxyl group-containing butadiene rubber (a3)) can be obtained by removing unreacted monomers to adjust the solid content concentration and the pH.

Further, an anti-aging agent, a preservative, an antibacterial agent, a dispersing agent, and the like may optionally be appropriately added to the latex of the carboxyl group-containing conjugated diene rubber (A) used in the present invention.

The number average particle diameter of the latex of the carboxyl group-containing conjugated diene rubber (A) used in the present invention is preferably 60 to 300 nm, and more preferably 80 to 150 nm. The particle size can be adjusted to a desired value by a method such as adjusting the amount of the emulsifier and the polymerization initiator to be used.

Metal Compound (B) Including Trivalent or Higher Metal

The latex composition of the present invention contains, in addition to the latex of the carboxyl group-containing conjugated diene rubber (A) described above, a metal compound (B) including a trivalent or higher metal. The content of the metal compound (B) including a trivalent or higher metal is in the range of 0.1 to 1.5 parts by weight, based on 100 parts by weight of the carboxyl group-containing conjugated diene rubber (A) included in the latex. In the latex composition of the present invention, the metal compound (B) including a trivalent or higher metal acts as a crosslinking agent.

According to the present invention, instead of sulfur, which is commonly used as a crosslinking agent, the metal compound (B) including a trivalent or higher metal is used as a crosslinking agent. Furthermore, during crosslinking, because there is no need to add a sulfur-containing vulcanization accelerator, in addition to immediate allergies (Type I), the occurrence of delayed allergies (Type IV) that are cause by sulfur and a sulfur-containing vulcanization accelerator can be effectively suppressed.

In addition, according to the present invention, by incorporating the specific amount of the metal compound (B) including a trivalent or higher metal in the latex of the carboxyl group-containing conjugated diene rubber (A), when made into a film famed article, such as a dip-molded article, the obtained film famed article, such as a dip-molded article, can have a supple texture in addition to high tensile strength and large elongation. In particular, when a film famed article, such as a dip-molded article, is used for a glove application, in addition to having high tensile strength and large elongation, it is important that when worn the glove confers a feeling of being used during performance of a task. The present inventors studied such a "usage feeling", and discovered that it is desirable to also exhibit excellent texture (low stress at 500% elongation).

The metal compound (B) including a trivalent or higher metal is not particularly limited as long as it is a compound including a trivalent or higher metal. Examples thereof may include an aluminum compound, a cobalt compound, a zirconium compound, a titanium compound, and the like. Of these, an aluminum compound is preferable from the perspective that the carboxyl group-containing conjugated diene rubber (A) included in the latex can be cross-linked more satisfactorily.

Example of the aluminum compound include, but are not particularly limited to, aluminum oxide, aluminum chloride, aluminum hydroxide, aluminum nitrate, aluminum sulfate, aluminum metal, aluminum ammonium sulfate, aluminum bromide, aluminum fluoride, aluminum potassium sulfate, aluminum isopropoxide, sodium aluminate, potassium aluminate, sodium aluminum sulfite, and the like. These aluminum compounds can be used singly or in combinations. Of these, sodium aluminate is preferable from the perspective that the action and effect of the present invention can be more remarkable.

The content of the metal compound (B) including a trivalent or higher metal in the latex composition of the present invention is 0.1 to 1.5 parts by weight based on 100 parts by weight of the carboxyl group-containing conjugated diene rubber (A) included in the latex, preferably 0.1 to 1.25 parts by weight, more preferably 0.1 to 1 part by weight, even more preferably 0.1 to 0.8 parts by weight, and particularly preferably 0.1 to 0.6 parts by weight. If the content of the metal compound including a trivalent or higher metal is too small, crosslinking is insufficient and the obtained film famed article, such as a dip-molded article, has poorer tensile strength. On the other hand, if the content is too much, when famed into a film famed article such as a dip-molded article, the obtained film famed article, such as a dip-molded article, has small elongation and poor texture.

Alcoholic Hydroxyl Group-Containing Compound (C)

Further, the latex composition of the present invention preferably comprises, in addition to the latex of the carboxyl group-containing conjugated diene rubber (A) and the metal compound (B) including a trivalent or higher metal, at least one alcoholic hydroxyl group-containing compound (C) selected from a saccharide (c1), a sugar alcohol (c2), a hydroxy acid (c3), and a hydroxy acid salt (c4).

By further containing an alcoholic hydroxyl group-containing compound (C), stability as a latex composition can be further increased, and furthermore, when made into a film famed article, such as a dip-molded article, the obtained film famed article, such as a dip-molded article, can have higher stress retention in addition to high tensile strength, large elongation, supple texture, and the like.

In particular, when using the metal compound (B) including a trivalent or higher metal as a crosslinking agent, blending the alcoholic hydroxyl group-containing compound (C) with such a metal compound (B) including a trivalent or higher metal enables the dispersion state of the metal compound (B) including a trivalent or higher metal in the latex composition to be better. As a result, the stability of the latex composition can be improved, and, due to the action of the metal compound (B) including a trivalent or higher metal and the alcoholic hydroxyl group-containing compound (C), the obtained film famed article, such as a dip-molded article, can have high stress retention in addition to high tensile strength, large elongation, and a supple texture.

In particular, when the film famed article, such as a dip-molded article, is used for a glove application, as described above, from the perspective of conferring a sense of being used when the glove is worn and used to perform task, it is important for the glove to have, in addition to high tensile strength and large elongation, a supple texture. From the perspective of further improving the "usage feeling", it is more preferable that the occurrence of looseness and bagginess that occurs over time since being worn can be effectively prevented (i.e., high stress retention represented as a percentage of a stress $M_{100}(6)$ after the elapse of 6 minutes since elongation was stopped with respect to a tensile stress $M_{100}(0)$ when the film famed article, such as a dip-molded article, is stretched at 100%). Therefore, from such a perspective, in addition to the latex of the carboxyl group-containing conjugated diene rubber (A) and the metal compound (B) including a trivalent or higher metal, it is preferable to further blend the alcoholic hydroxyl group-containing compound (C). As a result, while improving the stability of the latex composition, the obtained film famed article, such as a dip-molded article, can have high stress retention in addition to high tensile strength, large elongation, and better stress at 500% elongation (texture).

The alcoholic hydroxyl group-containing compound (C) used in the present invention is at least one selected from the saccharide (c1), the sugar alcohol (c2), the hydroxy acid (c3), and the hydroxy acid salt (c4). Of these, from the perspective of imparting better texture to and higher stress retention to the obtained film famed article, such as a dip-molded article, it is preferable to use at least one selected from the sugar alcohol (c2) and the hydroxy acid salt (c4). When two or more kinds of alcoholic hydroxyl group-containing compounds (C) are used in combination, it is preferable to use a combination of at least one selected from the saccharide (c1) and the sugar alcohol (c2) and at least one selected from the hydroxy acid (c3) and the hydroxy acid salt (c4), and more preferable to use a combination of the sugar alcohol (c2) and the hydroxy acid salt (c4).

The saccharide (c1) is not particularly limited as long as it is a monosaccharide or a polysaccharide in which two or more monosaccharides are bound by a glycosidic bond. Examples thereof may include monosaccharides such as erythrose, threose, ribose, lyxose, xylose, arabinose, allose, talose, gulose, altrose, galactose, idose, erythrulose, xylulose, ribulose, psicose, fructose, sorbose, and tagatose; disaccharides such as trehalose, maltose, isomaltose, cellobiose, gentiobiose, melibiose, lactose, sucrose, and palatinose; trisaccharides such as maltotriose, isomaltotriose, panose, cellotriose, manninotriose, solatriose, melezitose, planteose, gentianose, umbelliferose, lactosucrose, and raffinose; homo-oligosaccharides such as maltotetraose and isomaltotetraose; tetrasaccharides such as stachyose, cellotetraose, scorodose, lyquinose, and panose; pentasaccharides such as maltopentaose and isomaltopentaose; hexasaccharides such as maltohexaose and isomaltotetraose; and the like. These may be used singly or in combinations.

The sugar alcohol (c2) may be a sugar alcohol of a monosaccharide or a polysaccharide. Examples thereof may include, but are not particularly limited to, tritols such as glycerin; tetritols such as erythritol, D-threitol, L-threitol, and D-arabinitol; pentitols such as D-arabinitol, L-arabinitol, xylitol, ribitol, and pentaerythritol; pentaerythritol; hexitols such as sorbitol, D-iditol, galactitol, D-glucitol, and mannitol; heptitols such as volemitol and perseitol; octitols such as D-erythro-D-galacto-octitol; and the like. These may be used singly or in combinations. Among them, a hexitol, which is a sugar alcohol having 6 carbon atoms, is preferable, and sorbitol is more preferable.

The hydroxy acid (c3) is not particularly limited as long as it is a carboxylic acid having a hydroxyl group. Examples thereof may include aliphatic hydroxy acids such as glycolic acid, lactic acid, tartronic acid, glyceric acid, 2-hydroxybutyric acid, 3-hydroxybutyric acid, γ-hydroxy butyric acid, malic acid, 3-methylmalic acid, tartaric acid, citramalic acid, citric acid, isocitric acid, leucinic acid, mevalonic acid, pantoic acid, ricinoleic acid, ricinelaidic acid, cerebronic acid, quinic acid, shikimic acid, and serine; aromatic hydroxy acids such as salicylic acid, creosote acid (homosalicylic acid, hydroxy (methyl)benzoic acid), vanillic acid, sillic acid, hydroxypropanoic acid, hydroxypentanoic acid, hydroxyhexanoic acid, hydroxyheptanoic acid, hydroxyoctanoic acid, hydroxynonanoic acid, hydroxydecanoic acid, hydroxyundecanoic acid, hydroxydododecanoic acid, hydroxytridecanoic acid, hydroxytetradecanoic acid, hydroxypentadecanoic acid, hydroxyheptadecanoic acid, hydroxyoctadecanoic acid, hydroxynonadecanoic acid, and hydroxyicosanoic acid, monohydroxybenzoic acid derivatives such as ricinoleic acid, dihydroxybenzoic acid derivatives such as pyrocatechuic acid, resorcylic acid, protocatechuic acid, gentisic acid, and orthophosphoric acid, trihydroxybenzoic acid derivatives such as gallic acid, phenylacetic acid derivatives such as mandelic acid, benzilic acid, and atorlactic acid, cinnamic acid/hydrocinnamic acid derivatives such as melilotic acid, phloretic acid, coumaric acid, humic acid, cinnamic acid, ferulic acid, and sinapinic acid; and the like. These may be used singly or in combinations. Among them, an aliphatic hydroxy acid is preferable, an aliphatic α-hydroxy acid is more preferable, glycolic acid, lactic acid, tartronic acid, glyceric acid, malic acid, tartaric acid and citric acid are even more preferable, and glycolic acid is particularly preferable.

The hydroxy acid salt (c4) is not particularly limited as long as it is a salt of a hydroxy acid. Examples thereof may include the metal salts of the hydroxy acids exemplified as the hydroxy acid (c3), for example: salts of alkali metals such as sodium and potassium; and salts of alkali earth metals such as calcium and magnesium. One hydroxy acid salt (c4) may be used alone, or two or more kinds may be used in combination. As the hydroxy acid salt (c4), an alkali metal salt of a hydroxy acid is preferable, and a sodium salt of a hydroxy acid is more preferable. Further, the hydroxy acid constituting the hydroxy acid salt (c4) is preferably an aliphatic hydroxy acid, more preferably an aliphatic α-hydroxy acid, even more preferably glycolic acid, lactic acid, tartronic acid, glyceric acid, malic acid, tartaric acid, or citric acid, and glycolic acid is particularly preferable. In other words, sodium glycolate is particularly preferable as the hydroxy acid salt (c4).

The content of the alcoholic hydroxyl group-containing compound (C) metal compound including a trivalent or higher metal in the latex composition of the present invention is, in terms of the weight ratio of the "metal compound (B) including a trivalent or higher metal:alcoholic hydroxyl group-containing compound (C)", preferably set to an amount in the range of 1:0.1 to 1:50, more preferably in the range of 1:0.2 to 1:45, and even more preferably in the range of 1:0.3 to 1:30. By setting the content of the alcoholic hydroxyl group-containing compound (C) with respect to the metal compound (B) including a trivalent or higher metal within the above range, the effect of adding the alcoholic hydroxyl group-containing compound (C) can be further increased.

The content of the alcoholic hydroxyl group-containing compound (C) may be an amount such that the content of the alcoholic hydroxyl group-containing compound (C) relative to the metal compound including a trivalent or higher metal falls within the above range, but is preferably 0.03 to 15 parts by weight, and more preferably 0.05 to 10 parts by weight, based on 100 parts by weight of the carboxyl group-containing conjugated diene rubber (A) included in the latex.

The latex composition of the present invention can be obtained by, for example, blending the metal compound (B) including a trivalent or higher metal and the optionally-used alcoholic hydroxyl group-containing compound (C) with the latex of the carboxyl group-containing conjugated diene rubber (A). The method of blending the metal compound (B) including a trivalent or higher metal and the optionally-used alcoholic hydroxyl group-containing compound (C) with the latex of the carboxyl group-containing conjugated diene rubber (A) is not particularly limited, but from the perspective that the metal compound (B) including a trivalent or higher metal and the optionally-used alcoholic hydroxyl group-containing compound (C) can be well dispersed in the resulting latex composition, is preferably carried out by dissolving the metal compound (B) including a trivalent or higher metal and the optionally-used alcoholic hydroxyl group-containing compound (C) in water or an alcohol and then adding as an aqueous solution or an alcohol solution. In addition, it is preferable to add a stabilizer, such as a chelating agent or a buffer, in order to improve the stability of the solution when dissolving.

The latex composition of the present invention may optionally include, in addition to the latex of the carboxyl group-containing conjugated diene rubber (A), the metal compound (B) including a trivalent or higher metal, and the alcoholic hydroxyl group-containing compound (C), a filler, a pH adjusting agent, a thickening agent, an anti-aging agent, a dispersing agent, a pigment, a filler, a softening agent, and the like.

The solid content concentration of the latex composition of the present invention is preferably 10 to 40% by weight, and more preferably 15 to 35% by weight. Further, the pH of the latex composition of the present invention is preferably 7.5 to 12.0, more preferably 7.5 to 11.0, even more preferably 7.5 to 9.4, and particularly preferably 7.5 to 9.2.

Dip-Molded Article

The dip-molded article of the present invention is obtained by dip-molding the above-mentioned latex composition of the present invention.

An ordinary method may be employed as the dip-molding method. Examples thereof may include a direct immersion method, an anode coagulation immersion method, a Teague coagulation immersion method, and the like. Among them, the anode coagulation immersion method is preferable because it is easy to obtain a dip-molded article having a uniform thickness.

In the case of the anode coagulation immersion method, for example, a dip-molding mold is immersed in a coagulant solution, the coagulant adheres to the mold surface, and the mold is then immersed in the latex composition to form a dip-molded layer on the surface of the mold.

Examples of the coagulant include metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; sulfates such as calcium sulfate, magnesium sulfate, and aluminum sulfate; and the like. Among these, calcium chloride and calcium nitrate are preferable.

The coagulant is usually used as a solution of water, alcohol, or a mixture thereof. The coagulant concentration is usually 5 to 50% by weight, and preferably 10 to 35% by weight.

The obtained dip-molded layer is, generally, heat treated to carry out crosslinking. Before carrying out the heat treatment, the dip-molded layer may be immersed in water, preferably warm water of 30 to 70° C., for about 1 to 60 minutes to remove water-soluble impurities (e.g., surplus emulsifier, coagulant, etc.). The operation of removing water-soluble impurities may also be performed after the dip-molded layer is heat treated, but from the perspective of removing the water-soluble impurities more efficiently, it is preferable to perform the removal treatment before the heat treatment.

The crosslinking of the dip-molded layer is usually carried out by heat treating at a temperature of 80 to 150° C., preferably for 10 to 130 minutes. As the heating method, external heating with infrared rays or heated air or internal heating by high frequency can be employed. Of these methods, external heating with heated air is preferable.

Then, the cross-linked dip-molded layer is detached from the dip-molding mold to obtain the dip-molded article as a film-like film famed article. As the detachment method, it is possible to peel off from the molding mold by hand, or peel off using water pressure or pressure from compressed air. After detachment, heat treatment may be further carried out at a temperature of 60 to 120° C. for 10 to 120 minutes.

The film thickness of the film famed article is preferably 0.03 to 0.50 mm, more preferably 0.05 to 0.40 mm, and particularly preferably 0.08 to 0.30 mm. Incidentally, in addition to the method of dip-molding the above-mentioned latex composition of the present invention, the film famed article of the present invention can be produced by any method, as long as the method is capable of foaming the above-described latex composition of the present invention into a film shape (e.g., coating method, etc.).

Because the film famed article of the present invention, including the dip-molded article of the present invention, is obtained by using the above-mentioned latex composition of the present invention, the occurrence of delayed type allergies (Type IV) in addition to immediate allergies (Type I) can be suppressed, and the film famed article has high tensile strength, large elongation, and a supple texture. Therefore, the film famed article of the present invention is suitable for glove applications, especially surgical gloves. Alternatively, the film famed article of the present invention, including the dip-molded article of the present invention, can be used as a bag, as well as for medical products, such as a baby bottle nipple, a dropper, a tube, a water pillow, a balloon sack, a catheter, and a condom; toys, such as a balloon, a doll, and a ball; industrial goods, such as pressure-molding bags and bags for gas storage; fingerstalls, and the like.

EXAMPLES

The present invention is now described based on more detailed Examples. However, the present invention is not limited to these Examples. In the following, unless stated otherwise, "parts" is on a weight basis. In addition, the tests and evaluations were as follows.

Tensile Strength, Elongation at Break, and Stress at 500% Elongation

Dumbbell-shaped specimens were prepared from the rubber gloves as dip-molded articles obtained in the Examples and Comparative Examples by using a dumbbell (Die-C; manufactured by Dumbbell Co., Ltd.) according to ASTM D-412. Next, the obtained specimens were stretched at a stretching rate of 500 mm/min, and the tensile strength at break, the elongation at break, and the stress at 500% elongation were measured. It is noted that the higher the tensile strength and elongation at break, the more preferable, and the smaller the stress at 500% elongation, the more flexible the texture is, which is preferable.

Stress Retention

Dumbbell-shaped specimens were prepared from the rubber gloves as dip-molded articles obtained in the Examples and Comparative Examples by using a dumbbell (Die-C; manufactured by Dumbbell Co., Ltd.) according to ASTM D-412. A tensile stress was applied to both ends of the specimens at a rate of 500 mm/min, and when a 20 mm standard section of the specimen had elongated by a factor of 2 (100%), the elongation was stopped and a tensile stress $M_{100}(0)$ was measured. Further, a tensile stress $M_{100}(6)$ after 6 minutes passed was also measured. The percentage of $M_{100}(6)$ relative to $M_{100}(0)$ (i.e., percentage of $M_{100}(6)/M_{100}(0)$) was taken as the stress retention. The greater the stress retention, the less susceptible the glove is to slackness (looseness or bagginess) when used, which is preferable. It is noted that the stress retention measurement was carried out for Examples 2-1 to 2-9, 3-1 to 3-9, and 4-1 to 4-8, and Comparative Examples 2-1 to 2-3, 4-1, and 4-2.

Production Example 1

Production of Latex of Carboxyl Group-Containing Nitrile Rubber (a1-1)

A reaction vessel was charged with 34 parts of acrylonitrile, 62.5 parts of 1.3-butadiene, 3.5 parts of methacrylic acid, 0.4 parts of t-dodecylmercaptan, 132 parts of ion-exchanged water, 3 parts of sodium dodecylbenzene sulfonate, 0.5 parts of sodium β-naphthalene sulfonic acid formalin condensate, 0.3 parts of potassium persulfate, and 0.05 parts of sodium ethylenediamine tetraacetate, and polymerization was started while maintaining the polymerization temperature at 37° C. When the polymerization conversion ratio reached 70%, the polymerization temperature was raised to 44° C., and the reaction was continued until the polymerization conversion ratio reached 95%. Then, 0.1 parts of sodium dimethyldithiocarbamate was added as a polymerization terminator to terminate the polymerization reaction. Then, from the latex of the obtained copolymer, unreacted monomer was removed by distillation under reduced pressure, and then the solid content concentration and pH were adjusted to obtain a latex of a carboxyl group-containing nitrile rubber (a1-1) having a solid content of 40% and a pH of 7.5. The obtained carboxyl group-containing nitrile rubber (a1-1) had a composition of 34.0% by weight of the acrylonitrile unit, 62.5% by weight of the 1,3-butadiene unit, and 3.5% by weight of the methacrylic acid unit.

Production Example 2

Production of Latex of Carboxyl Group-Containing Nitrile Rubber (a1-2)

A latex of a carboxyl group-containing nitrile rubber (a1-2) having a solid content of 40% and a pH of 7.5 was obtained in the same manner as Production Example 1, except that the amount of acrylonitrile used was changed from 34 parts to 36 parts, the amount of 1.3-butadiene used was changed from 62.5 parts to 61 parts, and the amount of methacrylic acid used was changed from 3.5 parts to 3 parts. The obtained carboxyl group-containing nitrile rubber (a1-2) had a composition of 36.0% by weight of the acrylonitrile unit, 61.0% by weight of the 1,3-butadiene unit, and 3.0% by weight of the methacrylic acid unit.

Production Example 3

Production of Latex of Carboxyl Group-Containing Nitrile Rubber (a1-3)

A latex of a carboxyl group-containing nitrile rubber (a1-3) having a solid content of 40% and a pH of 7.5 was obtained in the same manner as Production Example 1, except that the amount of acrylonitrile used was changed from 34 parts to 28.0 parts and the amount of 1,3-butadiene used was changed from 62.5 parts to 68.5 parts. The obtained carboxyl group-containing nitrile rubber (a1-3) had a composition of 28.0% by weight of the acrylonitrile unit, 68.5% by weight of the 1,3-butadiene unit, and 3.5% by weight of the methacrylic acid unit.

Production Example 4

Production of Latex of Carboxyl Group-Containing Nitrile Rubber (a1-4)

A latex of a carboxyl group-containing nitrile rubber (a1-4) having a solid content of 40% and a pH of 7.0 was obtained in the same manner as Production Example 1, except that the amount of acrylonitrile used was changed from 34 parts to 30.5 parts, the amount of 1.3-butadiene used was changed from 62.5 parts to 63.5 parts, and the amount of methacrylic acid used was changed from 3.5 parts to 6 parts, and that after unreacted monomer was removed by distillation under reduced pressure, the pH was changed from 7.5 to 7.0. The obtained carboxyl group-containing nitrile rubber (a1-4) had a composition of 30.5% by weight of the acrylonitrile unit, 63.5% by weight of the 1,3-butadiene unit, and 6.0% by weight of the methacrylic acid unit.

Production Example 5

Production of Latex of Carboxyl Group-Containing Nitrile Rubber (a1-5)

A pressure-resistant polymerization reaction vessel equipped with a stirrer was charged with 63 parts of 1.3-butadiene, 34 parts of acrylonitrile, 3 parts of methacrylic acid, 0.25 parts of t-dodecylmercaptan as a chain transfer agent, 132 parts of deionized water, 3 parts of sodium dodecylbenzene sulfonate, 1 part of sodium β-naphthalene sulfonic acid formalin condensate, 0.3 parts of potassium persulfate, and 0.005 part of sodium ethylenediamine tetraacetate, and polymerization was started while maintaining the polymerization temperature at 37° C. When the polymerization conversion ratio reached 70%, the polymerization temperature was raised to 43° C., and the reaction was continued until the polymerization conversion ratio reached 95%. Then, 0.1 parts of sodium dimethyldithiocarbamate was added as a polymerization terminator to terminate the polymerization reaction. Then, from the latex of the obtained copolymer, unreacted monomer was removed by distillation under reduced pressure, and then the solid content concentration and pH were adjusted to obtain a latex of a carboxyl group-containing nitrile rubber (a1-5) having a solid content of 40% by weight and a pH of 8.0. The obtained carboxyl group-containing nitrile rubber (a1-5) had a composition of 63% by weight of the 1,3-butadiene unit, 34% by weight of the acrylonitrile unit, and 3% by weight of the methacrylic acid unit.

Production Example 6

Production of Latex of Carboxyl Group-Containing Nitrile Rubber (a2-1)

A pressure-resistant polymerization reaction vessel equipped with a stirrer was charged with 50 parts of deionized water, 0.3 parts of sodium dodecylbenzene sulfonate, 0.4 parts of t-dodecyl mercaptan, 63 parts of 1,3-butadiene, 34 parts of styrene, and 3 parts of methacrylic acid to obtain a monomer emulsion. A separate pressure-resistant polymerization reaction vessel equipped with a stirrer was charged with 40 parts of deionized water, 0.2 parts of sodium dodecylbenzenesulfonate, 0.35 parts of sodium bicarbonate, and 0.05 parts of sodium ethylenediamine tetraacetate, and the temperature was raised to 70° C. while stirring. Then, 0.5 parts of potassium persulfate was added to the mixture, and addition of the monomer emulsion obtained above was immediately started. The monomer emulsion was continuously added over 5 hours while stirring and mixing. After the addition of the monomer emulsion was complete, 0.2 parts of potassium persulfate was added in a 3% by weight aqueous solution. When the polymerization conversion ratio reached 90%, the temperature was raised to 85° C., and the reaction was continued for further 3 hours. When the polymerization conversion ratio reached 95%, 0.1 parts of sodium dimethyldithiocarbamate was added as a polymerization terminator to terminate the polymerization reaction. Then, from the latex of the obtained copolymer, unreacted monomer was removed by distillation under reduced pressure, and then the solid content concentration and pH were adjusted to obtain a latex of a carboxyl group-containing styrene-butadiene rubber (a2-1) having a solid content of 40% by weight and a pH of 8.0. The obtained carboxyl group-containing styrene-butadiene rubber (a2-1) had a composition of 63% by weight of the 1,3-butadiene unit, 34% by weight of the styrene unit, and 3% by weight of the methacrylic acid unit.

Production Example 7

Latex of Carboxyl Group-Containing Butadiene Rubber (a3-1)

A pressure-resistant polymerization reaction vessel equipped with a stirrer was charged with 97 parts of 1.3-butadiene, 3 parts of methacrylic acid, 0.8 parts of t-dodecylmercaptan as a chain transfer agent, 132 parts of deionized water, 3 parts of sodium dodecylbenzene sulfonate, 1 part of sodium β-naphthalene sulfonic acid formalin condensate, 0.3 parts of potassium persulfate, and 0.005 part of sodium ethylenediamine tetraacetate, and polymerization was started while maintaining the polymerization temperature at 37° C. When the polymerization conversion ratio reached 70%, the polymerization temperature was raised to 43° C., and the reaction was continued until the polymerization conversion ratio reached 95%. Then, 0.1 parts of sodium dimethyldithiocarbamate was added as a polymerization terminator to terminate the polymerization reaction. Then, from the latex of the obtained copolymer, unreacted monomer was removed by distillation under reduced pressure, and then the solid content concentration and pH were adjusted to obtain a latex of a carboxyl group-containing butadiene rubber (a3-1) having a solid content of 40% by weight and a pH of 8.0. The obtained carboxyl group-containing butadiene (a3-1) had a composition of 97% by weight of the 1,3-butadiene unit and 3% by weight of the methacrylic acid unit.

Production Example 8

Production of Latex of Carboxyl Group-Containing Nitrile Rubber (a1-6)

A pressure-resistant polymerization reaction vessel equipped with a stirrer was charged with 63 parts of 1.3-butadiene, 34 parts of acrylonitrile, 3 parts of methacrylic acid, 0.25 parts of t-dodecylmercaptan as a chain transfer agent, 132 parts of deionized water, 3 parts of sodium dodecylbenzene sulfonate, 1 part of sodium β-naphthalene sulfonic acid formalin condensate, and 0.01 parts of sodium hyposulfite, and the temperature of the polymerization reaction vessel was maintained at 5° C. Then, a mixture of 6 parts of ion-exchanged water, 0.020 parts of sodium ethylenediaminetetraacetate, 0.002 parts of ferrous sulfate, and 0.003 parts of sodium formaldehyde sulfoxylate was added to the polymerization reaction vessel, 0.004 parts of 1,1,3,3-tetramethylbutyl hydroperoxide was added, and polymerization was started while maintaining the polymerization temperature at 5° C. The reaction was continued until the polymerization conversion ratio reached 95%. Then, 0.1 parts of sodium dimethyldithiocarbamate was added as a polymerization terminator to terminate the polymerization reaction. It is noted that during the polymerization reaction the temperature of the reaction system was maintained in the range of 5 to 10° C. From the latex of the obtained copolymer, unreacted monomer was removed by distillation under reduced pressure, and then the solid content concentration and pH were adjusted to obtain a latex of a carboxyl group-containing nitrile rubber (a1-6) having a solid content of 40% by weight and a pH of 8.0. As a result of measuring the methyl ethyl ketone insoluble content of the carboxyl group-containing nitrile rubber (a1-6) included in the obtained latex and the degree of swelling in methyl ethyl ketone, the methyl ethyl ketone insoluble content was 80% by weight, and the degree of swelling in methyl ethyl ketone was 45 times. The obtained carboxyl group-containing nitrile rubber (a1-6) had a composition of 63% by weight of the 1,3-butadiene unit, 34% by weight of the acrylonitrile unit, and 3% by weight of the methacrylic acid unit.

Production Example 9

Production of Latex of Carboxyl Group-Containing Styrene-Butadiene Rubber (a2-1)

A pressure-resistant polymerization reaction vessel equipped with a stirrer was charged with 63 parts of 1.3-butadiene, 34 parts of styrene, 3 parts of methacrylic acid, 0.4 parts of t-dodecylmercaptan as a chain transfer agent, 132 parts of deionized water, 1.5 parts of sodium dodecylbenzene sulfonate, 1 part of sodium β-naphthalene sulfonic acid formalin condensate, and 0.01 parts of sodium hyposulfite, and the temperature of the polymerization reaction vessel was maintained at 10° C. Then, a mixture of 6 parts of ion-exchanged water, 0.05 parts of sodium ethylenediaminetetraacetate, 0.006 parts of ferrous sulfate, and 0.05 parts of sodium formaldehyde sulfoxylate was added to the polymerization reaction vessel, 0.15 parts of diisopropylbenzene hydroperoxide was added, and polymerization was started while maintaining the polymerization temperature at 10° C. When the polymerization conversion ratio reached 50% and 70%, 1.2 parts of deionized water and 0.5 parts of sodium dodecylbenzenesulfonate were added to the polymerization reaction vessel. The reaction was continued until the polymerization conversion ratio reached 95%. Then, 0.1 parts of sodium dimethyldithiocarbamate was added as a polymerization terminator to terminate the polymerization reaction. It is noted that during the polymerization reaction the temperature of the reaction system was maintained in the range of 10 to 15° C. From the latex of the obtained copolymer, unreacted monomer was removed by distillation under reduced pressure, and then the solid content concentration and pH were adjusted to obtain a latex of a carboxyl group-containing styrene-butadiene rubber (a2-2) having a solid content of 40% by weight and a pH of 8.0. As a result of measuring the methyl ethyl ketone insoluble content of the carboxyl group-containing styrene-butadiene rubber (a2-2) included in the obtained latex and the degree of swelling in methyl ethyl ketone, the methyl ethyl ketone insoluble content was 70% by weight, and the degree of swelling in methyl ethyl ketone was 60 times. The obtained carboxyl group-containing styrene-butadiene rubber (a2-2) had a composition of 63% by weight of the 1,3-butadiene unit, 34% by weight of the styrene unit, and 3% by weight of the methacrylic acid unit.

Production Example 10

Production of Latex of Carboxyl Group-Containing Butadiene Rubber (a3-2)

A pressure-resistant polymerization reaction vessel equipped with a stirrer was charged with 97 parts of 1.3-butadiene, 3 parts of methacrylic acid, 0.4 parts of t-dodecylmercaptan as a chain transfer agent, 135 parts of deionized water, 1.5 parts of sodium dodecylbenzene sulfonate, 1 part of sodium β-naphthalene sulfonic acid formalin condensate, and 0.01 parts of sodium hyposulfite, and the temperature of the polymerization reaction vessel was maintained at 10° C. Then, a mixture of 6 parts of ion-exchanged water, 0.02 parts of sodium ethylenediaminetetraacetate, 0.008 parts of ferrous sulfate, and 0.05 parts of sodium formaldehyde sulfoxylate was added to the polymerization reaction vessel, 0.05 parts of diisopropylbenzene hydroperoxide was added, and polymerization was started while maintaining the polymerization temperature at 10° C. When the polymerization conversion ratio reached 60% and 80%, 1.2 parts of deionized water and 0.5 parts of sodium dodecylbenzenesulfonate were added to the polymerization reaction vessel. Further, when the polymerization conversion reached 60%, 0.01 parts of diisopropylbenzene hydroperoxide was added. The reaction was continued until the polymerization conversion ratio reached 95%. Then, 0.1 parts of sodium dimethyldithiocarbamate was added as a polymerization terminator to terminate the polymerization reaction. It is noted that during the polymerization reaction the temperature of the reaction system was maintained in the range of 10 to 15° C. From the latex of the obtained copolymer, unreacted monomer was removed by distillation under reduced pressure, and then the solid content concentration and pH were adjusted to obtain a latex of a carboxyl group-containing butadiene rubber (a3-2) having a solid content of 40% by weight and a pH of 8.0. As a result of measuring the methyl ethyl ketone insoluble content of the carboxyl group-containing butadiene rubber (a3-2) included in the obtained latex and the degree of swelling in methyl ethyl ketone, the methyl ethyl ketone insoluble content was 65% by weight, and the degree of swelling in methyl ethyl ketone was 80-times. The obtained carboxyl group-containing butadiene rubber (a3-2) had a composition of 97% by weight of the 1,3-butadiene unit and 3% by weight of the methacrylic acid unit.

Production Example 11

Production of Latex of Carboxyl Group-Containing Nitrile Rubber (a1-7)

A latex of a carboxyl group-containing nitrile rubber (a1-7) was obtained in the same manner as Production Example 5, except that the amount of t-dodecylmercaptan used as a chain transfer agent was changed to 0.50 parts. As a result of measuring the methyl ethyl ketone insoluble content of the carboxyl group-containing nitrile rubber (a1-7) included in the obtained latex and the degree of swelling in methyl ethyl ketone, the methyl ethyl ketone insoluble content was 75% by weight, and the degree of swelling in methyl ethyl ketone was 30 times. The obtained carboxyl group-containing nitrile rubber (a1-7) had a composition of 63% by weight of the 1,3-butadiene unit, 34% by weight of the acrylonitrile unit, and 3% by weight of the methacrylic acid unit.

Production Example 12

Production of Latex of Carboxyl Group-Containing Nitrile Rubber (a1-8)

A latex of a carboxyl group-containing nitrile rubber (a1-8) was obtained in the same manner as Production Example 5, except that the amount of t-dodecylmercaptan used as a chain transfer agent was changed to 0.80 parts. As a result of measuring the methyl ethyl ketone insoluble content of the carboxyl group-containing nitrile rubber (a1-8) included in the obtained latex and the degree of swelling in methyl ethyl ketone, the methyl ethyl ketone insoluble content was 55% by weight, and the degree of swelling in methyl ethyl ketone was 60 times. The obtained carboxyl group-containing nitrile rubber (a1-8) had a composition of 63% by weight of the 1,3-butadiene unit, 34% by weight of the acrylonitrile unit, and 3% by weight of the methacrylic acid unit.

Production Example 13

Production of Latex of Carboxyl Group-Containing Nitrile Rubber (a1-9)

A pressure-resistant polymerization reaction vessel equipped with a stirrer was charged with 62.5 parts of 1.3-butadiene, 34 parts of acrylonitrile, 3 parts of methacrylic acid, 0.5 parts of N-methylolacrylamide as an amide group-containing monomer, 0.25 parts of t-dodecylmercaptan as a chain transfer agent, 132 parts of deionized water, 3 parts of sodium dodecylbenzene sulfonate, and 1 part of sodium β-naphthalene sulfonic acid formalin condensate, and the temperature of the polymerization reaction vessel was maintained at 5° C. Then, a mixture of 6 parts of ion-exchanged water, 0.020 parts of sodium ethylenediaminetetraacetate, 0.002 parts of ferrous sulfate, and 0.003 parts of sodium formaldehyde sulfoxylate was added to the polymerization reaction vessel, 0.004 parts of 1,1,3,3-tetramethylbutyl hydroperoxide was added, and polymerization was started. The reaction was continued until the polymerization conversion ratio reached 95%. Then, 0.1 parts of sodium dimethyldithiocarbamate was added as a polymerization terminator to terminate the polymerization reaction. From the latex of the obtained copolymer, unreacted monomer was removed by distillation under reduced pressure, and then the solid content concentration and pH were adjusted to obtain a latex of a carboxyl group-containing nitrile rubber (a1-9) having a solid content of 40% by weight and a pH of 8.0. The obtained carboxyl group-containing nitrile rubber (a1-9) had a composition of 62.5% by weight of the 1,3-butadiene unit, 34% by weight of the acrylonitrile unit, 3% by weight of the methacrylic acid unit, and 0.5% by weight of the N-methylolacrylamide unit.

Production Example 14

Production of Latex of Carboxyl Group-Containing Nitrile Rubber (a1-10)

A latex of a carboxyl group-containing nitrile rubber (a1-10) was obtained in the same manner as Production Example 13, except that 0.5 parts of glycidyl methacrylate as an epoxy group-containing monomer was used instead of the N-methylolacrylamide as an amide group-containing monomer. The obtained carboxyl group-containing nitrile rubber (a1-10) had a composition of 62.5% by weight of the 1,3-butadiene unit, 34% by weight of the acrylonitrile unit, 3% by weight of the methacrylic acid unit, and 0.5% by weight of the glycidyl methacrylate unit.

Production Example 15

Production of Latex of Carboxyl Group-Containing Nitrile Rubber (a1-11)

A latex of a carboxyl group-containing nitrile rubber (a1-11) was obtained in the same manner as Production Example 13, except that the amount of 1,3-butadiene used was changed to 61 parts and the amount of N-methylolacrylamide used as an amide group-containing monomer was changed to 2.0 parts. The obtained carboxyl group-containing nitrile rubber (a1-11) had a composition of 61% by weight of the 1,3-butadiene unit, 34% by weight of the acrylonitrile unit, 3% by weight of the methacrylic acid unit, and 2.0% by weight of the N-methylolacrylamide unit.

Production Example 16

Production of Latex of Carboxyl Group-Containing Nitrile Rubber (a1-12)

A latex of a carboxyl group-containing nitrile rubber (a1-12) was obtained in the same manner as Production Example 13, except that the amount of 1,3-butadiene used was changed to 61 parts and the amount of glycidyl methacrylate used as an epoxy group-containing monomer was changed to 2.0 parts. The obtained carboxyl group-containing nitrile rubber (a1-12) had a composition of 61% by weight of the 1,3-butadiene unit, 34% by weight of the acrylonitrile unit, 3% by weight of the methacrylic acid unit, and 2.0% by weight of the glycidyl methacrylate unit.

Production Example 17

Production of Latex of Carboxyl Group-Containing Styrene-Butadiene Rubber (a2-3)

A pressure-resistant polymerization reaction vessel equipped with a stirrer was charged with 50 parts of deionized water, 0.3 parts of sodium dodecylbenzene sulfonate, 0.4 parts of t-dodecyl mercaptan as a chain transfer agent, 62.5 parts of 1,3-butadiene, 34 parts of styrene, 3 parts of methacrylic acid, and 0.5 parts of N-methylolacrylamide as an amide group-containing monomer to obtain a monomer emulsion. A separate pressure-resistant polymerization reaction vessel equipped with a stirrer was charged with 40 parts of deionized water, 0.2 parts of sodium dodecylbenzenesulfonate, 0.35 parts of sodium bicarbonate, and 0.05 parts of sodium ethylenediamine tetraacetate, and the temperature was raised to 70° C. while stirring. Then, 0.5 parts of potassium persulfate was added to the mixture, and addition of the monomer emulsion obtained above was immediately started. The monomer emulsion was continuously added over 5 hours while stirring and mixing. After the addition of the monomer emulsion was complete, 0.2 parts of potassium persulfate was added in a 3% by weight aqueous solution. When the polymerization conversion ratio reached 90%, the temperature was raised to 85° C., and the reaction was continued for further 3 hours. When the polymerization conversion ratio reached 95%, 0.1 parts of sodium dimethyldithiocarbamate was added as a polymerization terminator to terminate the polymerization reaction. Then, from the latex of the obtained copolymer, unreacted monomer was removed by distillation under reduced pressure, and then the solid content concentration and pH were adjusted to obtain a latex of a carboxyl group-containing styrene-butadiene rubber (a2-3) having a solid content of 40% by weight and a pH of 8.0. The obtained carboxyl group-containing styrene-butadiene rubber (a2-3) had a composition of 62.5% by weight of the 1,3-butadiene unit, 34% by weight of the styrene unit, 3% by weight of the methacrylic acid unit, and 0.5% by weight of the N-methylolacrylamide unit.

Production Example 18

Production of Latex of Carboxyl Group-Containing Styrene-Butadiene Rubber (a2-4)

A latex of a carboxyl group-containing styrene-butadiene rubber (a2-4) was obtained in the same manner as Production Example 17, except that 0.5 parts of glycidyl methacrylate as an epoxy group-containing monomer was used instead of the N-methylolacrylamide as an amide group-containing monomer. The obtained carboxyl group-containing styrene-butadiene rubber (a2-4) had a composition of 62.5% by weight of the 1,3-butadiene unit, 34% by weight of the styrene unit, 3% by weight of the methacrylic acid unit, and 0.5% by weight of the glycidyl methacrylate unit.

Production Example 19

Latex of Carboxyl Group-Containing Butadiene Rubber (a3-3)

A pressure-resistant polymerization reaction vessel equipped with a stirrer was charged with 96.5 parts of 1.3-butadiene, 3 parts of methacrylic acid, 0.5 parts of N-methylolacrylamide as an amide group-containing monomer, 0.8 parts of t-dodecylmercaptan as a chain transfer agent, 132 parts of deionized water, 3 parts of sodium dodecylbenzene sulfonate, 1 part of sodium β-naphthalene sulfonic acid formalin condensate, 0.3 parts of potassium persulfate, and 0.005 part of sodium ethylenediamine tetraacetate, and polymerization was started while maintaining the polymerization temperature at 37° C. When the polymerization conversion ratio reached 70%, the polymerization temperature was raised to 43° C., and the reaction was continued until the polymerization conversion ratio reached 95%. Then, 0.1 parts of sodium dimethyldithiocarbamate was added as a polymerization terminator to terminate the polymerization reaction. Then, from the latex of the obtained copolymer, unreacted monomer was removed by distillation under reduced pressure, and then the solid content concentration and pH were adjusted to obtain a latex of a carboxyl group-containing butadiene rubber (a3-3) having a solid content of 40% by weight and a pH of 8.0. The obtained carboxyl group-containing butadiene (a3-3) had a composition of 96.5% by weight of the 1,3-butadiene unit, 3% by weight of the methacrylic acid unit, and 0.5% by weight of the N-methylolacrylamide unit.

Production Example 20

Latex of Carboxyl Group-Containing Butadiene Rubber (a3-4)

A latex of a carboxyl group-containing butadiene rubber (a3-4) was obtained in the same manner as Production Example 19, except that 0.5 parts of glycidyl methacrylate as an epoxy group-containing monomer was used instead of the N-methylolacrylamide as an amide group-containing monomer. The obtained carboxyl group-containing butadiene rubber (a3-4) had a composition of 96.5% by weight of the 1,3-butadiene unit, 3% by weight of the methacrylic acid unit, and 0.5% by weight of the glycidyl methacrylate unit.

Example 1-1

Preparation of Latex Composition

Deionized water was added to 250 parts of the latex of the carboxyl group-containing nitrile rubber (a1-1) obtained in Production Example 1 (100 parts in terms of carboxyl group-containing nitrile rubber (a1-1)) to give a solid content concentration of 35% by weight, and then an aqueous solution of sodium aluminate was added in an amount of 0.4 part in terms of sodium aluminate. Then, the pH of the composition was adjusted to 8.3 using potassium hydroxide, and deionized water was further added to adjust the solid content concentration to 30% by weight, thereby obtaining a latex composition. The obtained latex composition was subjected to an operation for removing aggregates and the like in the latex composition by filtration as needed (an operation for removing aggregates and the like was carried out in the same manner in the following Examples 1-2 to 1-5 and Comparative Example 1-1 to 1-4, as necessary).

Production of Dip-Molded Article

An aqueous coagulant solution was prepared by mixing 13 parts of calcium nitrate, 0.05 parts of polyethylene glycol octylphenyl ether as a nonionic emulsifier, and 87 parts of water. Next, a ceramic glove mold pre-heated to 70° C. was immersed in the coagulant aqueous solution for 5 seconds, removed, and dried at a temperature of 70° C. for 10 minutes to adhere the coagulant to the glove mold. Then, the glove mold to which the coagulant was adhered was immersed in the latex composition obtained above for 10 seconds, removed, and immersed in warm water at 50° C. for 90 seconds to elute water-soluble impurities, and form a dip-molded layer in the glove mold.

Next, the glove mold having the dip-molded layer famed thereon was heat-treated at a temperature of 125° C. for 25 minutes to crosslink the dip-molded layer. The cross-linked dip-molded layer was then peeled off of the glove mold to obtain a dip-molded article (rubber glove). Then, the obtained dip-molded article (rubber glove) was measured regarding tensile strength, elongation at break, and stress at 500% elongation. The results are shown in Table 1.

Example 1-2

A latex composition and a dip-molded article (rubber glove) were produced in the same manner as Example 1-1, except that when preparing the latex composition, the amount of the aqueous solution of sodium aluminate added was changed to 0.2 parts in terms of sodium aluminate and the pH of the composition was adjusted to 8.5. Evaluation was carried out in the same manner as Example 1-1. The results are shown in Table 1.

Example 1-3

A latex composition and a dip-molded article (rubber glove) were produced in the same manner as Example 1-1, except that when preparing the latex composition, the latex of the carboxyl group-containing nitrile rubber (a1-2) obtained in Production Example 2 (100 parts in terms of carboxyl group-containing nitrile rubber (a1-2)) was used instead of the latex of the carboxyl group-containing nitrile rubber (a1-1) obtained in Production Example 1, the amount of the aqueous solution of sodium aluminate added was changed to 0.3 parts in terms of sodium aluminate, and the pH of the composition was adjusted to 8.5. Evaluation was carried out in the same manner as Example 1-1. The results are shown in Table 1.

Example 1-4

A latex composition and a dip-molded article (rubber glove) were produced in the same manner as Example 1-2, except that when preparing the latex composition, the latex of the carboxyl group-containing nitrile rubber (a1-3) obtained in Production Example 3 (100 parts in terms of carboxyl group-containing nitrile rubber (a1-3)) was used instead of the latex of the carboxyl group-containing nitrile rubber (a1-1) obtained in Production Example 1, and the pH of the composition was adjusted to 8.3. Evaluation was carried out in the same manner as Example 1-2. The results are shown in Table 1.

Example 1-5

A latex composition and a dip-molded article (rubber glove) were produced in the same manner as Example 1-2, except that when preparing the latex composition, the latex of the carboxyl group-containing nitrile rubber (a1-4) obtained in Production Example 4 (100 parts in teams of carboxyl group-containing nitrile rubber (a1-4)) was used instead of the latex of the carboxyl group-containing nitrile rubber (a1-1) obtained in Production Example 1, and the pH of the composition was adjusted to 7.5. Evaluation was carried out in the same manner as Example 1-2. The results are shown in Table 1.

Comparative Example 1-1

A latex composition and a dip-molded article (rubber glove) were produced in the same manner as Example 1-1, except that when preparing the latex composition, an aqueous solution of sodium aluminate was not added, and the pH of the composition was adjusted to 8.4. Evaluation was carried out in the same manner as Example 1-1. The results are shown in Table 1.

Comparative Example 1-2

A latex composition and a dip-molded article (rubber glove) were produced in the same manner as Example 1-1, except that when preparing the latex composition, 1 part of sulfur (crosslinking agent), 0.5 parts of zinc dibutyldithiocarbamate (vulcanization accelerator), and 1.2 parts of zinc oxide were used in place of the aqueous solution of sodium aluminate, and the pH of the composition was adjusted to 8.5. Evaluation was carried out in the same manner as Example 1-1. The results are shown in Table 1.

Comparative Example 1-3

A latex composition and a dip-molded article (rubber glove) were produced in the same manner as Example 1-1, except that when preparing the latex composition, 1.5 parts of zinc oxide was used in place of the aqueous solution of sodium aluminate. Evaluation was carried out in the same manner as Example 1-1. The results are shown in Table 1.

Comparative Example 1-4

A latex composition and a dip-molded article (rubber glove) were produced in the same manner as Example 1-1, except that when preparing the latex composition, the amount of the aqueous solution of sodium aluminate added was changed to 2.0 parts in terms of sodium aluminate. Evaluation was carried out in the same manner as Example 1-1. The results are shown in Table 1.

[Table 1]

TABLE 1

|  |  | Examples | | | | | Comparative Examples | | | |
|---|---|---|---|---|---|---|---|---|---|---|
|  |  | 1-1 | 1-2 | 1-3 | 1-4 | 1-5 | 1-1 | 1-2 | 1-3 | 1-4 |
| Kind of Carboxyl Group-Containing Conjugated Diene Rubber |  | (a1-1) | (a1-1) | (a1-2) | (a1-3) | (a1-4) | (a1-1) | (a1-1) | (a1-1) | (a1-1) |
| Composition of Carboxyl Group-Containing Conjugated Diene Rubber |  | | | | | | | | | |
| 1,3-Butadiene Unit | (% by weight) | 62.5 | 62.5 | 61.0 | 68.5 | 63.5 | 62.5 | 62.5 | 62.5 | 62.5 |
| Acrylonitrile Unit | (% by weight) | 34.0 | 34.0 | 36.0 | 28.0 | 30.5 | 34.0 | 34.0 | 34.0 | 34.0 |
| Methacrylic Acid Unit | (% by weight) | 3.5 | 3.5 | 3.0 | 3.5 | 6.0 | 3.5 | 3.5 | 3.5 | 3.5 |
| Conditions for Production of Carboxyl Group-Containing Conjugated Diene Rubber |  | | | | | | | | | |
| Emulsification Polymerization Temperature | (° C.) | 37-45 | 37-45 | 37-45 | 37-45 | 37-45 | 37-45 | 37-45 | 37-45 | 37-45 |
| Amount of Chain Transfer Agent Used Per 100 Parts of Monomer Mixture | (parts) | 0.4 | 0.4 | 0.4 | 0.4 | 0.4 | 0.4 | 0.4 | 0.4 | 0.4 |
| Latex Composition Blend |  | | | | | | | | | |
| Carboxyl Group-Containing Nitrile Rubber | (parts) | 100 | 100 | 100 | 100 | 100 | 100 | 100 | 100 | 100 |
| Sodium Aluminate | (parts) | 0.4 | 0.2 | 0.3 | 0.2 | 0.2 | — | — | — | 2.0 |
| Sulfur | (parts) | — | — | — | — | — | — | 1 | — | — |
| Zinc Dibutyldithiocarbamate | (parts) | — | — | — | — | — | — | 0.5 | — | — |
| Zinc Oxide | (parts) | — | — | — | — | — | — | 1.2 | 1.5 | — |
| Evaluation of Dip-Molded Article |  | | | | | | | | | |
| Tensile Strength of Dip-Molded Article | (MPa) | 20.5 | 19.6 | 21.6 | 14.0 | 22.8 | 8.3 | 28.3 | 24.2 | 26.4 |
| Elongation at Break of Dip-Molded Article | (%) | 730 | 760 | 730 | 710 | 660 | 980 | 610 | 630 | 640 |
| Stress at 500% Elongation of Dip-Molded Article | (MPa) | 3.1 | 2.8 | 3.0 | 2.3 | 5.3 | 1.8 | 15.7 | 13.8 | 7.5 |

Evaluation of Examples 1-1 to 1-5 and Comparative Examples 1-1 to 1-4

As shown in Table 1, a dip-molded article (rubber glove) obtained using a latex composition containing a latex of a carboxylic group-containing conjugated diene rubber (A) and a metal compound (B) including a trivalent or higher metal, and having a content of the trivalent or higher metal of 0.1 to 1.5 parts by weight based on 100 parts by weight of the carboxyl group-containing conjugated diene rubber (A), exhibits high tensile strength, large elongation, and a supple texture (low stress at 500% elongation) (Examples 1-1 to 1-5).

On the other hand, when the metal compound (B) including a trivalent or higher metal was not added, the dip-molded article (rubber glove) was inferior in tensile strength (Comparative Example 1-1).

When sulfur was used in combination with a vulcanization accelerator and zinc oxide instead of the metal compound (B) including a trivalent or higher metal, elongation was small and the stress at 500% elongation was inferior (Comparative Example 1-2). In Comparative Example 1-2, it is considered that the occurrence of delayed allergies (Type IV) could not be suppressed due to the inclusion of sulfur and a vulcanization accelerator.

In addition, when zinc oxide was used alone instead of the metal compound (B) including a trivalent or higher metal, elongation was small and stress at 500% elongation was inferior (Comparative Example 1-3).

Furthermore, when the amount of the metal compound (B) including a trivalent or higher metal was too large, elongation was small and stress at 500% elongation was inferior (Comparative Example 1-4).

Example 2-1

Preparation of Latex Composition

A mixed aqueous solution obtained by dissolving 0.5 parts of sodium aluminate, 0.75 parts of sorbitol, and 0.75 parts of sodium glycolate in water was added to 250 parts of the latex of the carboxyl group-containing nitrile rubber (a1-5) obtained in Production Example 5 (100 parts in terms of the carboxyl group-containing nitrile rubber (a1-5)). Then, deionized water was added thereto to adjust the solid content concentration to 30% by weight, whereby a latex composition was obtained.

Production of Dip-Molded Article

An aqueous coagulant solution was prepared by mixing 30 parts of calcium nitrate, 0.05 parts of polyethylene glycol octylphenyl ether as a nonionic emulsifier, and 70 parts of water. Next, a ceramic glove mold pre-heated to 70° C. was immersed in the coagulant aqueous solution for 5 seconds, removed, and dried at a temperature of 70° C. for 10 minutes to adhere the coagulant to the glove mold. Then, the glove mold to which the coagulant was adhered was immersed in the latex composition obtained above for 10 seconds, removed, and immersed in warm water at 50° C. for 90 seconds to elute water-soluble impurities, and form a dip-molded layer in the glove mold.

Next, the glove mold having the dip-molded layer famed thereon was heat-treated at a temperature of 125° C. for 25 minutes to crosslink the dip-molded layer. The cross-linked dip-molded layer was then peeled off of the glove mold to obtain a dip-molded article (rubber glove). Then, the obtained dip-molded article (rubber glove) was measured in accordance with the methods described above regarding tensile strength, elongation at break, stress at 500% elongation, and stress retention. The results are shown in Table 2.

Example 2-2

A latex composition having a solid content of 30% by weight and a dip-molded article (rubber glove) were produced in the same manner as Example 2-1, except that when preparing the latex composition, 250 parts of the latex of the carboxyl group-containing styrene-butadiene rubber (a2-1) obtained in Production Example 6 (100 parts in terms of the carboxyl group-containing styrene-butadiene rubber (a2-1)) was used instead of the latex of the carboxyl group-containing nitrile rubber (a1-5). Evaluation was carried out in the same manner as Example 2-1. The results are shown in Table 2.

Example 2-3

A latex composition having a solid content of 30% by weight and a dip-molded article (rubber glove) were produced in the same manner as Example 2-1, except that when preparing the latex composition, 250 parts of the latex of the carboxyl group-containing butadiene rubber (a3-1) obtained in Production Example 7 (100 parts in terms of the carboxyl group-containing butadiene rubber (a3-1)) was used instead of the latex of the carboxyl group-containing nitrile rubber (a1-5). Evaluation was carried out in the same manner as Example 2-1. The results are shown in Table 2.

Example 2-4

A latex composition having a solid content of 30% by weight and a dip-molded article (rubber glove) were produced in the same manner as Example 2-1, except that when preparing the latex composition, the blended amount of sorbitol was changed to 1.5 parts, and sodium glycolate was not added. Evaluation was carried out in the same manner as Example 2-1. The results are shown in Table 2.

Example 2-5

A latex composition having a solid content of 30% by weight and a dip-molded article (rubber glove) were produced in the same manner as Example 2-1, except that when preparing the latex composition, the blended amount of sodium glycolate was changed to 1.5 parts, and sorbitol was not added. Evaluation was carried out in the same manner as Example 2-1. The results are shown in Table 2.

Example 2-6

A latex composition having a solid content of 30% by weight and a dip-molded article (rubber glove) were produced in the same manner as Example 2-1, except that when preparing the latex composition, the blended amount of sodium aluminate was changed to 0.1 parts, the blended amount of sorbitol was changed to 0.015 parts, and the blended amount of sodium glycolate was changed to 0.015 parts. Evaluation was carried out in the same manner as Example 2-1. The results are shown in Table 2.

Example 2-7

A latex composition having a solid content of 30% by weight and a dip-molded article (rubber glove) were produced in the same manner as Example 2-1, except that when preparing the latex composition, the blended amount of sodium aluminate was changed to 0.1 parts, the blended amount of sorbitol was changed to 0.5 parts, and the blended amount of sodium glycolate was changed to 0.5 parts. Evaluation was carried out in the same manner as Example 2-1. The results are shown in Table 2.

Example 2-8

A latex composition having a solid content of 30% by weight and a dip-molded article (rubber glove) were produced in the same manner as Example 2-1, except that when preparing the latex composition, the blended amount of sodium aluminate was changed to 1 part, the blended amount of sorbitol was changed to 0.15 parts, and the blended amount of sodium glycolate was changed to 0.15 parts. Evaluation was carried out in the same manner as Example 2-1. The results are shown in Table 2.

Example 2-9

A latex composition having a solid content of 30% by weight and a dip-molded article (rubber glove) were produced in the same manner as Example 2-1, except that when preparing the latex composition, the blended amount of sodium aluminate was changed to 1 part, the blended amount of sorbitol was changed to 5 parts, and the blended amount of sodium glycolate was changed to 5 parts. Evaluation was carried out in the same manner as Example 2-1. The results are shown in Table 2.

Comparative Example 2-1

A latex composition having a solid content of 30% by weight and a dip-molded article (rubber glove) were produced in the same manner as Example 2-1, except that when preparing the latex composition, sodium aluminate, sorbitol, and sodium glycolate were not added. Evaluation was carried out in the same manner as Example 2-1. The results are shown in Table 2.

Comparative Example 2-2

A latex composition having a solid content of 30% by weight and a dip-molded article (rubber glove) were produced in the same manner as Example 2-2, except that when preparing the latex composition, sodium aluminate, sorbitol, and sodium glycolate were not added. Evaluation was carried out in the same manner as Example 2-2. The results are shown in Table 2.

Comparative Example 2-3

A latex composition having a solid content of 30% by weight and a dip-molded article (rubber glove) were produced in the same manner as Example 2-3, except that when preparing the latex composition, sodium aluminate, sorbitol, and sodium glycolate were not added. Evaluation was carried out in the same manner as Example 2-3. The results are shown in Table 2.

TABLE 2

| | | Examples | | | | | | | | | Comparative Examples | | |
| --- | --- | --- | --- | --- | --- | --- | --- | --- | --- | --- | --- | --- | --- |
| | | 2-1 | 2-2 | 2-3 | 2-4 | 2-5 | 2-6 | 2-7 | 2-8 | 2-9 | 2-1 | 2-2 | 2-3 |
| Kind of Carboxyl Group-Containing Conjugated Diene Rubber | | (a1-5) | (a2-1) | (a3-1) | (a1-5) | (a1-5) | (a1-5) | (a1-5) | (a1-5) | (a1-5) | (a1-5) | (a2-1) | (a3-1) |

TABLE 2-continued

|  |  | Examples ||||||||| Comparative Examples |||
| --- | --- | --- | --- | --- | --- | --- | --- | --- | --- | --- | --- | --- | --- |
|  |  | 2-1 | 2-2 | 2-3 | 2-4 | 2-5 | 2-6 | 2-7 | 2-8 | 2-9 | 2-1 | 2-2 | 2-3 |
| Composition of Carboxyl Group-Containing Conjugated Diene Rubber | | | | | | | | | | | | | |
| 1,3-Butadiene Unit | (% by weight) | 63.0 | 63.0 | 97.0 | 63.0 | 63.0 | 63.0 | 63.0 | 63.0 | 63.0 | 63.0 | 63.0 | 97.0 |
| Acrylonitrile Unit | (% by weight) | 34.0 | — | — | 34.0 | 34.0 | 34.0 | 34.0 | 34.0 | 34.0 | 34.0 | — | — |
| Styrene Unit | (% by weight) | — | 34.0 | — | — | — | — | — | — | — | — | 34.0 | — |
| Methacrylic Acid Unit | (% by weight) | 3.0 | 3.0 | 3.0 | 3.0 | 3.0 | 3.0 | 3.0 | 3.0 | 3.0 | 3.0 | 3.0 | 3.0 |
| Conditions for Production of Carboxyl Group-Containing Conjugated Diene Rubber | | | | | | | | | | | | | |
| Emulsification Polymerization Temperature | (° C.) | 37-43 | 70 | 37-43 | 37-43 | 37-43 | 37-43 | 37-43 | 37-43 | 37-43 | 37-43 | 70 | 37-43 |
| Amount of Chain Transfer Agent Used Per 100 Parts of Monomer Mixture | (parts) | 0.25 | 0.4 | 0.8 | 0.25 | 0.25 | 0.25 | 0.25 | 0.25 | 0.25 | 0.25 | 0.4 | 0.8 |
| Latex Composition Blend | | | | | | | | | | | | | |
| Carboxyl Group-Containing Nitrile Rubber | (parts) | 100 | — | — | 100 | 100 | 100 | 100 | 100 | 100 | 100 | — | — |
| Carboxyl Group-Containing Styrene-Butadiene Rubber | (parts) | — | 100 | — | — | — | — | — | — | — | — | 100 | — |
| Carboxyl Group-Containing Butadiene Rubber | (parts) | — | — | 100 | — | — | — | — | — | — | — | — | 100 |
| Sodium Aluminate | (parts) | 0.5 | 0.5 | 0.5 | 0.5 | 0.5 | 0.1 | 0.1 | 1 | 1 | — | — | — |
| Sorbitol | (parts) | 0.75 | 0.75 | 0.75 | 1.5 | — | 0.016 | 0.5 | 0.18 | 5 | — | — | — |
| Sodium Glycolate | (parts) | 0.75 | 0.75 | 0.75 | — | 1.5 | 0.018 | 0.5 | 0.15 | 5 | — | — | — |
| Evaluation of Dip-Molded Article | | | | | | | | | | | | | |
| Tensile Strength of Dip-Molded Article | (MPa) | 18.0 | 19.4 | 14.7 | 18.3 | 18.4 | 11.2 | 11.8 | 14.8 | 14.1 | 7.7 | 10.9 | 5.1 |
| Elongation at Break of Dip-Molded Article | (%) | 720 | 850 | 800 | 710 | 710 | 870 | 960 | 500 | 480 | 920 | 680 | 1100 |
| Stress at 500% Elongation of Dip-Molded Article | (MPa) | 5.7 | 5.4 | 3.6 | 5.7 | 5.8 | 1.8 | 1.7 | 11.2 | 11.1 | 1.5 | 2.8 | 1.2 |
| Stress Retention of Dip-Molded Article | (%) | 70 | 61 | 88 | 70 | 70 | 60 | 60 | 75 | 75 | 45 | 50 | 40 |

Evaluation of Examples 2-1 to 2-9 and Comparative Examples 2-1 to 2-3

From Table 2, the following can be confirmed.

Specifically, a latex composition prepared by blending, in addition to the metal compound (B) including a trivalent or higher metal, an alcoholic hydroxyl group-containing compound (C) to a latex of the carboxyl group-containing conjugated diene rubber (A), has excellent stability as a latex composition, and a dip-molded article (rubber glove) obtained using such a latex composition has high tensile strength, large elongation, and a supple texture (small stress at 500% elongation), while achieving high stress retention (Examples 2-1 to 2-9).

On the other hand, when the latex composition does not comprise the metal compound (B) including a trivalent or higher metal and the alcoholic hydroxyl group-containing compound (C), the dip-molded article (rubber glove) famed from the resulting latex composition exhibited low tensile strength (Comparative Examples 2-1 to 2-3).

Example 3-1

Preparation of Latex Composition

A mixed aqueous solution obtained by dissolving 0.2 parts of sodium aluminate, 0.4 parts of sorbitol, and 0.4 parts of sodium glycolate in water was added to 250 parts of the latex of the carboxyl group-containing nitrile rubber (a1-6) obtained in Production Example 8 (100 parts in terms of the carboxyl group-containing nitrile rubber (a1-6)). Then, deionized water and aqueous 5% by weight potassium hydroxide were added thereto to adjust the solid content concentration to 30% by weight and the pH to 9.2, whereby a latex composition was obtained.

Production of Dip-Molded Article

An aqueous coagulant solution was prepared by mixing 30 parts of calcium nitrate, 0.05 parts of polyethylene glycol octylphenyl ether as a nonionic emulsifier, and 70 parts of water. Next, a ceramic glove mold pre-heated to 70° C. was immersed in the coagulant aqueous solution for 5 seconds, removed, and dried at a temperature of 70° C. for 10 minutes to adhere the coagulant to the glove mold. Then, the glove mold to which the coagulant was adhered was immersed in the latex composition obtained above for 10 seconds, removed, and immersed in warm water at 50° C. for 90 seconds to elute water-soluble impurities, and form a dip-molded layer in the glove mold.

Next, the glove mold having the dip-molded layer famed thereon was heat-treated at a temperature of 125° C. for 25 minutes to crosslink the dip-molded layer. The cross-linked dip-molded layer was then peeled off of the glove mold to obtain a dip-molded article (rubber glove). Then, the obtained dip-molded article (rubber glove) was measured in accordance with the methods described above regarding tensile strength, elongation at break, stress at 500% elongation, and stress retention. The results are shown in Table 3.

Example 3-2

A latex composition having a solid content of 30% by weight and a dip-molded article (rubber glove) were produced in the same manner as Example 3-1, except that when preparing the latex composition, 250 parts of the latex of the carboxyl group-containing styrene-butadiene rubber (a2-2) obtained in Production Example 9 (100 parts in terms of the carboxyl group-containing styrene-butadiene rubber (a2-2)) was used instead of the latex of the carboxyl group-containing nitrile rubber (a1-6). Evaluation was carried out in the same manner as Example 3-1. The results are shown in Table 3.

Example 3-3

A latex composition having a solid content of 30% by weight and a dip-molded article (rubber glove) were produced in the same manner as Example 3-1, except that when preparing the latex composition, 250 parts of the latex of the carboxyl group-containing butadiene rubber (a3-2) obtained in Production Example 10 (100 parts in terms of the carboxyl group-containing butadiene rubber (a3-2)) was used instead of the latex of the carboxyl group-containing nitrile rubber (a1-6). Evaluation was carried out in the same manner as Example 3-1. The results are shown in Table 3.

Example 3-4

A latex composition having a solid content of 30% by weight and a dip-molded article (rubber glove) were produced in the same manner as Example 3-1, except that the blended amount of sodium aluminate was changed from 0.2 parts to 0.5 parts, the blended amount of sorbitol was changed from 0.4 parts to 0.75 parts, and the blended amount of sodium glycolate was changed from 0.4 parts to 0.75 parts. Evaluation was carried out in the same manner as Example 3-1. The results are shown in Table 3.

Example 3-5

A latex composition having a solid content of 30% by weight and a dip-molded article (rubber glove) were produced in the same manner as Example 3-1, except that when preparing the latex composition, 250 parts of the latex of the carboxyl group-containing nitrile rubber (a1-5) obtained in Production Example 5 (100 parts in terms of the carboxyl group-containing nitrile rubber (a1-5)) was used instead of the latex of the carboxyl group-containing nitrile rubber (a1-6). Evaluation was carried out in the same manner as Example 3-1. The results are shown in Table 3.

Example 3-6

A latex composition having a solid content of 30% by weight and a dip-molded article (rubber glove) were produced in the same manner as Example 3-1, except that when preparing the latex composition, 250 parts of the latex of the carboxyl group-containing styrene-butadiene rubber (a2-1) obtained in Production Example 6 (100 parts in terms of the carboxyl group-containing styrene-butadiene rubber (a2-1)) was used instead of the latex of the carboxyl group-containing nitrile rubber (a1-6). Evaluation was carried out in the same manner as Example 3-1. The results are shown in Table 3.

Example 3-7

A latex composition having a solid content of 30% by weight and a dip-molded article (rubber glove) were produced in the same manner as Example 3-1, except that when preparing the latex composition, 250 parts of the latex of the carboxyl group-containing butadiene rubber (a3-1) obtained in Production Example 7 (100 parts in terms of the carboxyl group-containing butadiene rubber (a3-1)) was used instead of the latex of the carboxyl group-containing nitrile rubber (a1-6). Evaluation was carried out in the same manner as Example 3-1. The results are shown in Table 3.

Example 3-8

A latex composition having a solid content of 30% by weight and a dip-molded article (rubber glove) were produced in the same manner as Example 3-1, except that when preparing the latex composition, 250 parts of the latex of the carboxyl group-containing nitrile rubber (a1-7) obtained in Production Example 11 (100 parts in terms of the carboxyl group-containing nitrile rubber (a1-7)) was used instead of the latex of the carboxyl group-containing nitrile rubber (a1-6). Evaluation was carried out in the same manner as Example 3-1. The results are shown in Table 3.

Example 3-9

A latex composition having a solid content of 30% by weight and a dip-molded article (rubber glove) were produced in the same manner as Example 3-1, except that when preparing the latex composition, 250 parts of the latex of the carboxyl group-containing nitrile rubber (a1-8) obtained in Production Example 12 (100 parts in terms of the carboxyl group-containing nitrile rubber (a1-8)) was used instead of the latex of the carboxyl group-containing nitrile rubber (a1-6). Evaluation was carried out in the same manner as Example 3-1. The results are shown in Table 3.

TABLE 3

|  |  | \multicolumn{9}{c}{Examples} |
|---|---|---|---|---|---|---|---|---|---|---|
|  |  | 3-1 | 3-2 | 3-3 | 3-4 | 3-5 | 3-6 | 3-7 | 3-8 | 3-9 |
| Kind of Carboxyl Group-Containing Conjugated Diene Rubber | | (a1-8) | (a2-2) | (a3-2) | (a1-8) | (a1-6) | (a2-1) | (a3-1) | (a1-7) | (a1-8) |
| Composition of Carboxyl Group-Containing Conjugated Diene Rubber | | | | | | | | | | |
| 1,3-Butadiene Unit | (% by weight) | 83.0 | 63.0 | 97.0 | 63.0 | 63.0 | 63.0 | 97.0 | 63.0 | 63.0 |
| Acrylonitrile Unit | (% by weight) | 34.0 | — | — | 34.0 | 34.0 | — | — | 34.0 | 34.0 |
| Styrene Unit | (% by weight) | — | 34.0 | — | — | — | 34.0 | — | — | — |
| Methacrylic Acid Unit | (% by weight) | 3.0 | 3.0 | 3.0 | 3.0 | 3.0 | 3.0 | 3.0 | 3.0 | 3.0 |
| Conditions for Production of Carboxyl Group-Containing Conjugated Diene Rubber | | | | | | | | | | |
| Emulsification Polymerization Temperature | (° C.) | 5 | 10 | 10 | 5 | 37-43 | 70 | 37-43 | 37-43 | 37-43 |
| Amount of Chain Transfer Agent Used Per 100 Parts of Monomer Mixture | (parts) | 0.25 | 0.4 | 0.4 | 0.25 | 0.25 | 0.4 | 0.8 | 0.5 | 0.8 |
| Latex Composition Blend | | | | | | | | | | |
| Carboxyl Group-Containing Nitrile Rubber | (parts) | 100 | — | — | 100 | 100 | — | — | 100 | 100 |
| Carboxyl Group-Containing Styrene-Butadiene Rubber | (parts) | — | 100 | — | — | — | 100 | — | — | — |
| Carboxyl Group-Containing Butadiene Rubber | (parts) | — | — | 100 | — | — | — | 100 | — | — |
| Sodium Aluminate | (parts) | 0.2 | 0.2 | 0.2 | 0.5 | 0.2 | 0.2 | 0.2 | 0.2 | 0.2 |
| Sorbitol | (parts) | 0.4 | 0.4 | 0.4 | 0.75 | 0.4 | 0.4 | 0.4 | 0.4 | 0.4 |
| Sodium Glycolate | (parts) | 0.4 | 0.4 | 0.4 | 0.75 | 0.4 | 0.4 | 0.4 | 0.4 | 0.4 |
| Evaluation of Dip-Molded Article | | | | | | | | | | |
| Tensile Strength of Dip-Molded Article | (MPa) | 22.3 | 17.2 | 16.2 | 24.5 | 17.0 | 13.5 | 12.5 | 16.4 | 12.3 |
| Elongation at Break of Dip-Molded Article | (%) | 800 | 770 | 900 | 780 | 780 | 740 | 850 | 940 | 1020 |
| Stress at 500% Elongation of Dip-Molded Article | (MPa) | 3.4 | 4.5 | 2.8 | 5.3 | 3.8 | 4.8 | 3.0 | 2.9 | 2.7 |
| Stress Retention of Dip-Molded Article | (%) | 62 | 59 | 57 | 70 | 62 | 54 | 56 | 55 | 50 |

Evaluation of Examples 3-1 to 3-9

From Table 3, the following can be confirmed.

Specifically, by comparing Examples 3-1 to 3-4 and Examples 3-5 to 3-7, it can be continued using a carboxyl group-containing conjugated diene rubber (A) obtained by emulsion polymerization at 0 to 25° C. achieves an even better improvement in tensile strength than when a carboxyl group-containing conjugated diene rubber (A) obtained by emulsion polymerization at 37° C. to 70° C. is used. In particular, from the results in Table 3, it can be continued that by using a carboxyl group-containing conjugated diene rubber (A) obtained by emulsion polymerization at 0 to 25° C., the tensile strength can be further improved while maintaining a large elongation and a supple texture (small stress at 500% elongation).

Further, a comparison of Examples 3-5, 3-8, and 3-9 shows that tensile strength, elongation, and a supple texture (small stress at 500% elongation) can be appropriately adjusted within a suitable range by varying the amount of chain transfer agent used in a range of 0.15 to 0.95 parts by weight based on 100 parts by weight of the monomer mixture.

Example 4-1

Preparation of Latex Composition

A mixed aqueous solution obtained by dissolving 0.2 parts of sodium aluminate, 0.4 parts of sorbitol, and 0.4 parts of sodium glycolate in water was added to 250 parts of the latex of the carboxyl group-containing nitrile rubber (a1-9) obtained in Production Example 13 (100 parts in terms of the carboxyl group-containing nitrile rubber (a1-9)). Then, deionized water and aqueous 5% potassium hydroxide were added thereto to adjust the solid content concentration to 30% by weight and the pH to 9.2, whereby a latex composition was obtained.

Production of Dip-Molded Article

An aqueous coagulant solution was prepared by mixing 30 parts of calcium nitrate, 0.05 parts of polyethylene glycol octylphenyl ether as a nonionic emulsifier, and 70 parts of water. Next, a ceramic glove mold pre-heated to 70° C. was immersed in the coagulant aqueous solution for 5 seconds, removed, and dried at a temperature of 70° C. for 10 minutes to adhere the coagulant to the glove mold. Then, the glove mold to which the coagulant was adhered was immersed in the latex composition obtained above for 10 seconds, removed, and immersed in warm water at 50° C. for 90 seconds to elute water-soluble impurities, and form a dip-molded layer in the glove mold.

Next, the glove mold having the dip-molded layer famed thereon was heat-treated at a temperature of 125° C. for 25 minutes to crosslink the dip-molded layer. The cross-linked dip-molded layer was then peeled off of the glove mold to obtain a dip-molded article (rubber glove). Then, the obtained dip-molded article (rubber glove) was measured in accordance with the methods described above regarding tensile strength, elongation at break, stress at 500% elongation, and stress retention. The results are shown in Table 4.

Example 4-2

A latex composition and a dip-molded article (rubber glove) were produced in the same manner as Example 4-1, except that when preparing the latex composition, 250 parts of the latex of the carboxyl group-containing nitrile rubber (a1-10) obtained in Production Example 14 (100 parts in terms of the carboxyl group-containing nitrile rubber (a1-10)) was used instead of the latex of the carboxyl group-containing nitrile rubber (a1-9). Evaluation was carried out in the same manner as Example 4-1. The results are shown in Table 4.

Example 4-3

A latex composition and a dip-molded article (rubber glove) were produced in the same manner as Example 4-1, except that when preparing the latex composition, 250 parts of the latex of the carboxyl group-containing nitrile rubber (a1-11) obtained in Production Example 15 (100 parts in terms of the carboxyl group-containing nitrile rubber (a1-11)) was used instead of the latex of the carboxyl group-containing nitrile rubber (a1-9). Evaluation was carried out in the same manner as Example 4-1. The results are shown in Table 4.

Example 4-4

A latex composition and a dip-molded article (rubber glove) were produced in the same manner as Example 4-1, except that when preparing the latex composition, 250 parts of the latex of the carboxyl group-containing nitrile rubber (a1-12) obtained in Production Example 16 (100 parts in terms of the carboxyl group-containing nitrile rubber (a1-12)) was used instead of the latex of the carboxyl group-containing nitrile rubber (a1-9). Evaluation was carried out in the same manner as Example 4-1. The results are shown in Table 4.

Example 4-5

A latex composition and a dip-molded article (rubber glove) were produced in the same manner as Example 4-1, except that when preparing the latex composition, 250 parts of the latex of the carboxyl group-containing styrene-butadiene rubber (a2-3) obtained in Production Example 17 (100 parts in terms of the carboxyl group-containing styrene-butadiene rubber (a2-3)) was used instead of the latex of the carboxyl group-containing nitrile rubber (a1-9). Evaluation was carried out in the same manner as Example 4-1. The results are shown in Table 4.

Example 4-6

A latex composition and a dip-molded article (rubber glove) were produced in the same manner as Example 4-1, except that when preparing the latex composition, 250 parts of the latex of the carboxyl group-containing styrene-butadiene rubber (a2-4) obtained in Production Example 18 (100 parts in terms of the carboxyl group-containing styrene-butadiene rubber (a2-4)) was used instead of the latex of the carboxyl group-containing nitrile rubber (a1-9). Evaluation was carried out in the same manner as Example 4-1. The results are shown in Table 4.

Example 4-7

A latex composition and a dip-molded article (rubber glove) were produced in the same manner as Example 4-1, except that when preparing the latex composition, 250 parts of the latex of the carboxyl group-containing butadiene rubber (a3-3) obtained in Production Example 19 (100 parts in terms of the carboxyl group-containing butadiene rubber (a3-3)) was used instead of the latex of the carboxyl group-containing nitrile rubber (a1-9). Evaluation was carried out in the same manner as Example 4-1. The results are shown in Table 4.

Example 4-8

A latex composition and a dip-molded article (rubber glove) were produced in the same manner as Example 4-1, except that when preparing the latex composition, 250 parts of the latex of the carboxyl group-containing butadiene rubber (a3-4) obtained in Production Example 20 (100 parts in terms of the carboxyl group-containing butadiene rubber (a3-4)) was used instead of the latex of the carboxyl group-containing nitrile rubber (a1-9). Evaluation was carried out in the same manner as Example 4-1. The results are shown in Table 4.

Comparative Example 4-1

A latex composition and a dip-molded article (rubber glove) were produced in the same manner as Example 4-1, except that when preparing the latex composition, sodium aluminate, sorbitol, and sodium glycolate were not added. Evaluation was carried out in the same manner as Example 4-1. The results are shown in Table 4.

Comparative Example 4-2

A latex composition and a dip-molded article (rubber glove) were produced in the same manner as Example 4-2, except that when preparing the latex composition, sodium aluminate, sorbitol, and sodium glycolate were not added. Evaluation was carried out in the same manner as Example 4-2.

The results are shown in Table 4.

TABLE 4

| | | Examples | | | | | | | | Comparative Examples | |
|---|---|---|---|---|---|---|---|---|---|---|---|
| | | 4-1 | 4-2 | 4-3 | 4-4 | 4-5 | 4-6 | 4-7 | 4-8 | 4-1 | 4-2 |
| Kind of Carboxyl Group-Containing Conjugated Diene Rubber Composition of Carboxyl Group-Containing Conjugated Diene Rubber | | (a1-9) | (a1-10) | (a1-11) | (a1-12) | (a2-3) | (a2-4) | (a3-3) | (a3-4) | (a1-9) | (a1-10) |
| 1,3-Butadiene Unit | (% by weight) | 62.5 | 62.5 | 61 | 61 | 62.5 | 62.5 | 96.5 | 96.5 | 62.5 | 62.5 |
| Acrylonitrile Unit | (% by weight) | 34 | 34 | 34 | 34 | — | — | — | — | 34 | 34 |
| Styrene Unit | (% by weight) | — | — | — | — | 34 | 34 | — | — | — | — |
| Methacrylic Acid Unit | (% by weight) | 3 | 3 | 3 | 3 | 3 | 3 | 3 | 3 | 3 | 3 |
| N-methylolacrylamide Unit | (% by weight) | 0.5 | — | 2.0 | — | 0.5 | — | 0.5 | — | 0.5 | — |

TABLE 4-continued

|  |  | Examples | | | | | | | | Comparative Examples | |
| --- | --- | --- | --- | --- | --- | --- | --- | --- | --- | --- | --- |
|  |  | 4-1 | 4-2 | 4-3 | 4-4 | 4-5 | 4-6 | 4-7 | 4-8 | 4-1 | 4-2 |
| Glycidyl Methacrylate | (% by weight) | — | 0.5 | — | 2.0 | — | 0.5 | — | 0.5 | — | 0.5 |
| Conditions for Production of Carboxyl Group-Containing Conjugated Diene Rubber | | | | | | | | | | | |
| Emulsification Polymerization Temperature | (° C.) | 5 | 5 | 5 | 5 | 70 | 70 | 37-43 | 37-43 | 5 | 6 |
| Amount of Chain Transfer Agent Used Per 100 Parts of Monomer Mixture | (parts) | 0.26 | 0.25 | 0.25 | 0.26 | 0.4 | 0.4 | 0.8 | 0.8 | 0.25 | 0.25 |
| Latex Composition Blend | | | | | | | | | | | |
| Carboxyl Group-Containing Nitrile Rubber | (parts) | 100 | 100 | 100 | 100 | — | — | — | — | 100 | 100 |
| Carboxyl Group-Containing Styrene-Butadiene Rubber | (parts) | — | — | — | — | 100 | 100 | — | — | — | — |
| Carboxyl Group-Containing Butadiene Rubber | (parts) | — | — | — | — | — | — | 100 | 100 | — | — |
| Sodium Aluminate | (parts) | 0.2 | 0.2 | 0.2 | 0.2 | 0.2 | 0.2 | 0.2 | 0.2 | — | — |
| Sorbitol | (parts) | 0.4 | 0.4 | 0.4 | 0.4 | 0.4 | 0.4 | 0.4 | 0.4 | — | — |
| Sodium Glycolate | (parts) | 0.4 | 0.4 | 0.4 | 0.4 | 0.4 | 0.4 | 0.4 | 0.4 | — | — |
| Evaluation of Dip-Molded Article | | | | | | | | | | | |
| Tensile Strength of Dip-Molded Article | (MPa) | 20.3 | 20.5 | 22.0 | 22.0 | 12.9 | 12.5 | 11.8 | 11.9 | 7.5 | 8.5 |
| Elongation at Break of Dip-Molded Article | (%) | 830 | 800 | 860 | 860 | 710 | 700 | 830 | 800 | 900 | 880 |
| Stress at 500% Elongation of Dip-Molded Article | (MPa) | 3.2 | 3.3 | 4.5 | 4.6 | 4.8 | 4.7 | 3.0 | 2.8 | 2.0 | 2.1 |
| Stress Retention of Dip-Molded Article | (%) | 68 | 65 | 70 | 71 | 64 | 64 | 65 | 65 | 52 | 53 |

Evaluation of Examples 4-1 to 4-8 and Comparative Examples 4-1 and 4-2

From Table 4, the following can be confirmed.

Specifically, when a compound including an amide group-containing monomer unit or an epoxy group-containing monomer unit is used as the carboxyl group-containing conjugated diene rubber (A) forming the latex of the carboxyl group-containing conjugated diene rubber (A), the resulting dip-molded article (rubber glove) can be made to have higher stress retention (Examples 4-1 to 4-8). In particular, from the results in Table 4, it can be confirmed that when a compound including an amide group-containing monomer unit or an epoxy group-containing monomer unit is used as the carboxyl group-containing conjugated diene rubber (A), the stress retention rate can be further improved while maintaining a high tensile strength, large elongation, and supple texture (small stress at 500% elongation).

On the other hand, even when a compound including an amide group-containing monomer unit or an epoxy group-containing monomer unit is used as the carboxyl group-containing conjugated diene rubber (A), when the metal compound (B) including a trivalent or higher metal and the alcoholic hydroxyl group-containing compound (C) are not included, the resultant dip-molded article (rubber glove) has inferior tensile strength and stress retention (Comparative Examples 4-1 and 4-2).

The invention claimed is:

1. A latex composition comprising a latex of a carboxyl group-containing conjugated diene rubber (A), a metal compound (B) including a trivalent or higher metal, and at least one alcoholic hydroxyl group-containing compound (C) selected from the group consisting of a saccharide (c1), a sugar alcohol (c2), a hydroxy acid (c3), and a hydroxy acid salt (c4), wherein
 a content of the metal compound (B) is 0.1 to 1.5 parts by weight, based on 100 parts by weight of the carboxyl group-containing conjugated diene rubber (A).

2. The latex composition according to claim 1, wherein the metal compound (B) is an aluminum compound.

3. The latex composition according to claim 1, wherein a content of the metal compound (B) and a content of the alcoholic hydroxyl group-containing compound (C) are such that a weight ratio expressed as "metal compound (B): alcoholic hydroxyl group-containing compound (C)" is 1:0.1 to 1:50.

4. The latex composition according to claim 1, wherein the alcoholic hydroxyl group-containing compound (C) is at least one selected from the sugar alcohol (c2) and the hydroxy acid salt (c4).

5. The latex composition according to claim 1, wherein the carboxyl group-containing conjugated diene rubber (A) is a carboxyl group-containing nitrile rubber (a1) containing 56 to 78% by weight of a conjugated diene monomer unit, 20 to 40% by weight of an ethylenically unsaturated nitrile monomer unit, and 2 to 6.5% by weight of an ethylenically unsaturated carboxylic acid monomer.

6. The latex composition according to claim 1, wherein the carboxyl group-containing conjugated diene rubber (A) contains a conjugated diene monomer unit, an ethylenically unsaturated carboxylic acid monomer unit, and at least one monomer unit selected from an amide group-containing monomer unit and an epoxy group-containing monomer unit.

7. The latex composition according to claim 6, wherein the monomer constituting the at least one monomer unit selected from an amide group-containing monomer unit and an epoxy group-containing monomer unit is (meth)acrylamide.

8. The latex composition according to claim 6, wherein the monomer constituting the at least one monomer unit selected from an amide group-containing monomer unit and an epoxy group-containing monomer unit is an epoxy group-containing (meth)acrylate.

9. A method for producing a latex composition comprising a latex of a carboxyl group-containing conjugated diene rubber (A), and a metal compound (B) including a trivalent or higher metal, and at least one alcoholic hydroxyl group-containing compound (C) selected from the group consisting of a saccharide (c1), a sugar alcohol (c2), a hydroxy acid (c3), and a hydroxy acid salt (c4), comprising:
- a first step of obtaining the latex of the carboxyl group-containing conjugated diene rubber (A) by emulsion polymerization of a monomer mixture comprising at least a conjugated diene monomer and an ethylenically unsaturated carboxylic acid monomer at 0 to 25° C.; and
- a second step of blending the metal compound (B) and the alcoholic hydroxyl group-containing compound (C) with the latex of the carboxyl group-containing conjugated diene rubber (A).

10. A method for producing a latex composition comprising a latex of a carboxyl group-containing conjugated diene rubber (A), and a metal compound (B) including a trivalent or higher metal, and at least one alcoholic hydroxyl group-containing compound (C) selected from the group consisting of a saccharide (c1), a sugar alcohol (c2), a hydroxy acid (c3), and a hydroxy acid salt (c4), comprising:
- a first step of obtaining the latex of the carboxyl group-containing conjugated diene rubber (A) by emulsion polymerization of a monomer mixture comprising at least a conjugated diene monomer and an ethylenically unsaturated carboxylic acid monomer in the presence of 0.15 to 0.95 parts by weight of a chain transfer agent based on 100 parts by weight of the monomer mixture; and
- a second step of blending the metal compound (B) and the alcoholic hydroxyl group-containing compound (C) with the latex of the carboxyl group-containing conjugated diene rubber (A).

11. A method for producing a dip-molded article, comprising a step of dip-molding a latex composition according to claim 1.

12. A film formed article that is formed from a latex composition according to claim 1.

13. The latex composition according to claim 1, wherein the hydroxy acid salt (c4) is at least one salt of at least one hydroxy acid selected from the group consisting of glycolic acid, lactic acid, tartronic acid, glyceric acid, malic acid, tartaric acid, and citric acid.

14. The latex composition according to claim 1, wherein the alcoholic hydroxyl group-containing compound (C) comprises the sugar alcohol (c2) and the hydroxy acid salt (c4).

* * * * *